United States Patent
Lehtovirta et al.

(10) Patent No.: US 11,233,817 B2
(45) Date of Patent: *Jan. 25, 2022

(54) METHODS AND APPARATUS FOR END DEVICE DISCOVERING ANOTHER END DEVICE

(71) Applicant: Telefonaktiebolaget LM Ericsson (publ), Stockholm (SE)

(72) Inventors: Vesa Lehtovirta, Jorvas (FI); Katharina Pfeffer, Graz (AT); Vesa Torvinen, Turku (FI); Monica Wifvesson, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 52 days.

This patent is subject to a terminal disclaimer.

(21) Appl. No.: 16/794,767

(22) Filed: Feb. 19, 2020

(65) Prior Publication Data

US 2020/0187003 A1 Jun. 11, 2020

Related U.S. Application Data

(63) Continuation of application No. 15/566,103, filed as application No. PCT/EP2015/080499 on Dec. 18, 2015, now Pat. No. 10,602,356.

(Continued)

(51) Int. Cl.
*H04L 29/06* (2006.01)
*H04W 8/00* (2009.01)
(Continued)

(52) U.S. Cl.
CPC ......... *H04L 63/1441* (2013.01); *H04W 8/005* (2013.01); *H04W 12/06* (2013.01); *H04W 12/069* (2021.01); *H04W 48/16* (2013.01)

(58) Field of Classification Search
CPC ..... H04W 8/005; H04W 48/16; H04W 12/06; H04L 63/1441
See application file for complete search history.

(56) References Cited

U.S. PATENT DOCUMENTS 10,602,356 B2 * 3/2020 Lehtovirta ............ H04W 12/06
11,109,206 B2 * 8/2021 Suh ........................ H04W 76/14
(Continued)

FOREIGN PATENT DOCUMENTS

CN 103119976 5/2013
CN 103546942 1/2014
(Continued)

OTHER PUBLICATIONS

International Search Report and Written Opinion issued in International Application No. PCT/EP2015/080499, dated Apr. 12, 2016, 11 pages.
(Continued)

*Primary Examiner* — Thaddeus J Plecha
(74) *Attorney, Agent, or Firm* — Rothweil, Figg, Ernst & Manbeck, P.C.

(57) ABSTRACT

A method performed by a proximity service server. The method comprises generating a ProSe query code and a ProSe response code, sending at least the ProSe response code together with a first and a second discovery key to a first end device, and sending at least the first discovery key and the ProSe query code to a second end device, so that the second end device can securely discover the first end device over an air interface.

9 Claims, 20 Drawing Sheets

Related U.S. Application Data

(60) Provisional application No. 62/146,613, filed on Apr. 13, 2015.

(51) Int. Cl.
  *H04W 48/16* (2009.01)
  *H04W 12/06* (2021.01)
  *H04W 12/069* (2021.01)

(56) References Cited

U.S. PATENT DOCUMENTS

| | | | | |
|---|---|---|---|---|
| 2013/0012168 A1* | 1/2013 | Rajadurai | ............ | H04W 8/265 |
| | | | | 455/411 |
| 2013/0290696 A1 | 10/2013 | Broustis et al. | | |
| 2014/0344578 A1 | 11/2014 | Kim et al. | | |
| 2014/0348081 A1 | 11/2014 | Liao | | |
| 2016/0119963 A1* | 4/2016 | Casati | ................ | H04W 72/042 |
| | | | | 455/434 |
| 2016/0295347 A1 | 10/2016 | Ahmad et al. | | |
| 2016/0295406 A1 | 10/2016 | Agiwal et al. | | |
| 2016/0309401 A1 | 10/2016 | Baek et al. | | |
| 2016/0381543 A1 | 12/2016 | Zhang et al. | | |
| 2018/0279394 A1 | 9/2018 | Peng et al. | | |

FOREIGN PATENT DOCUMENTS

| | | |
|---|---|---|
| CN | 103731902 | 4/2014 |
| CN | 104254129 | 12/2014 |
| CN | 104285422 A | 1/2015 |
| JP | 2018-529240 | 10/2018 |

OTHER PUBLICATIONS

Ericsson: "pCR for a security solution for Restricted Direct Discovery using Model B", 3GPP TSG SA WG3 (Security) Meeting #78, S3-151172, Revision of S3-15118, Sorrento, Italy, Jan. 26-30, 2015, 6 pages.

ETSI TS 133 303 V12.2.0, "Universal Mobile Telecommunications System (UMTS); LTE; Proximity-based Services (ProSe); Security aspects (3GPP TS 33.303 version 12.2.0 Release 12)", Jan. 2015, 67 pages.

ETSI TS 123 303 V12.4.0, Universal Mobile Telecommunications System (UMTS); LTE; Proximity-based services (ProSe); Stage 2 (3GPP TS 23.303 version 12.4.0 Release 12), Apr. 2015, 64 pages.

METIS, FP7-ICT-317669-METIS/D2.4, Feb. 28, 2015, 4 pages.

3GPP TS 33.303 V12.3.0, 3rd Generation Partnership Project; Technical Specification Group Services and System Aspects; Proximity-based Services (ProSe); Security aspects (Release 12), Mar. 2015, 64 pages.

3GPP TR 23.713 V0.4.0, 3rd Generation Partnership Project; Technical Specification Group Services and System Aspects; Study on extended architecture support for Proximity-based services (Release 13), Feb. 5, 2014, 67 pages.

Notice of Reasons for Rejection issued in Japanese Patent Application No. 2017-553117, dated Dec. 4, 2018, 2 pages.

Ericsson, "ProSe Restricted Discovery in Model B with Match Report procedure initiated by Discoverer UE only", 3GPP TSG SA WG3 (Security) Meeting #79, S3-151316, Nanjing, Republic of China, Apr. 20-24, 2015, 11 pages.

Ericsson, "ProSe Restricted Discovery in Model B with local MIC Checking", 3GPP TSG-SA WG3 Meeting #79, S3-151317, Nanjing, Republic of China, Apr. 20-24, 2015, 7 pages.

Ericsson, "Discussion of omptimized security solutions for ProSe Restricted Direct Discovery using Model B", 3GPP TSG-SA WG3 Meeting #79, S3-151315, Nanjing, Republic of China, Apr. 20-24, 2015, 4 pages.

First Chinese Office Action with Chinese Search Report dated Jan. 10, 2020, issued in Chinese Patent Application No. 201580080901. 9, 10 pages.

* cited by examiner

METHODS AND APPARATUS FOR END DEVICE DISCOVERING ANOTHER END DEVICE

CROSS-REFERENCE TO RELATED APPLICATIONS

This application is a continuation of U.S. patent application Ser. No. 15/566,103, which has a 371(c) date of Oct. 12, 2017 and which is the U.S. national stage of International Patent Application No. PCT/EP2015/080499, filed on Dec. 18, 2015, which claims priority to U.S. provisional patent application No. 62/146,613, filed on Apr. 13, 2015. The above identified applications are incorporated by this reference.

TECHNICAL FIELD

This relates to methods for enabling an end device securely discovering another end device. It also relates to servers and end devices for enabling an end device securely discovering another end device.

BACKGROUND

Proximity Services (ProSe) are services that can be provided by the 3GPP system based on UEs being in proximity to each other. One of these services is ProSe Discovery. The ProSe service is described in 3GPP TS 22.278 and 3GPP TS 23.303 and it allows the possibility of Device-to-Device (D2D) communication, without passing messages through the Radio Access Network.

ProSe Discovery identifies that ProSe-enabled UEs are in proximity of each other, using evolved UMTS Terrestrial Radio Access (E-UTRA), whether or not they are using the evolved UMTS Terrestrial Radio Access Network (E-UTRAN) or the Extended Packet Core (EPC) network, when permission, authorization and proximity criteria are fulfilled. The proximity criteria can be configured by the operator.

The ProSe Discovery process involves a discovery message being sent over an air interface by one device, and received by another. The other device then responds with a discovery message. Both discovery messages comprise a ProSe code for identifying each of the devices. However, one device may replay the ProSe code received from the other device and so pretend to be said other device. Therefore, there is a need for devices to securely discover one another as they are in proximity of each other.

SUMMARY

In accordance with an aspect of the invention, there is provided a method performed by a proximity service server comprising, generating a ProSe query code and a ProSe response code, sending at least the ProSe response code together with a first and a second discovery key to a first end device, and sending at least the first discovery key and the ProSe query code to a second end device, so that the second end device can securely discover the first end device over an air interface.

In one embodiment, the method further comprises, as a preliminary step, generating the first discovery key and the second discovery key. The method may also comprise, as a preliminary step, receiving the first and second discovery keys from a key management server.

In one embodiment the method comprises generating a discovery filter based on the ProSe Query code and sending it to the first end device.

In another embodiment the method comprises, receiving a discovery request from the second end device indicating that the second end device wishes to discover the first end device over an air interface, the proximity service server thereafter sends the first discovery key and ProSe query code to the second end device.

The method may further comprise sending the ProSe response code to a second proximity service server with which the second end device is in communication.

In one embodiment, the method comprises receiving from the second end device a match report request comprising the ProSe response code and a token based on the second discovery key.

In an alternative embodiment, the method comprises verifying the token using the second discovery key.

If the token is verified, the method may further comprise sending a match report response to the second end device indicating that the first end device is genuine.

In one embodiment, the method comprises sending the second discovery key to the second end device so that the second end device can verify that the first end device is genuine.

In one embodiment, the second end device comprises a plurality of second end devices such that the method may comprise, sending the ProSe query code and the first discovery key to each second end device.

According to another aspect of the invention, there is provided a server comprising generation unit for generating a ProSe query code and a ProSe response code, a transmission unit for sending at least the ProSe response code together with a first and a second discovery key to a first end device, and sending at least the first discovery key and the ProSe query code to a second end device, so that the second end device can securely discover the first end device over an air interface.

According to a further aspect of the invention, there is provided a server comprising a processor and a memory, the memory containing instructions executable by the processor, such that the network node is operable to carry out a method comprising: generating a ProSe query code and a ProSe response code; sending at least the ProSe response code together with a first and a second discovery key to a Discoveree UE; and sending the first discovery key, the second discover key, and the ProSe query code to a Discoverer UE via a second proximity service server in an HPLMN of the Discoverer UE, so that the Discoverer UE can verify that the Discoveree UE is genuine.

According to yet another aspect of the invention, there is provided a method performed by an end device, the method comprising, receiving a first discovery key, a second discovery key and a ProSe response code from a proximity service server, receiving a direct discovery request comprising a ProSe query code and a token from a second end device wishing to discover the end device, verifying the token using the first discovery key.

The method may further comprise the first end device receiving from the proximity service server a discovery filter based on a ProSe query code.

In one embodiment, the first end device receives the ProSe query code and the token over an air interface and the token is based on the first discovery key.

If the first end device verifies the token received from the second end device, the method may further comprise sending to the second end device a discovery response comprising a second token based on the second discovery key.

In one embodiment, the method comprises as a preliminary step, the end device sending to its proximity service server a discovery request so as to request that the second end device is allowed to discover said end device.

According to another aspect of the invention, there is provided an end device comprising a transmission unit for receiving a first discovery key, a second discovery key and a ProSe response code from a proximity service server, and for receiving a direct discovery request comprising a ProSe query code and a token from a second end device wishing to discover the end device, a verification unit for verifying the token using the first discovery key.

According to yet another aspect of the invention, there is provided an end device comprising a processor and a memory, the memory containing instructions executable by the processor, such that the network node is operable to carry out any of the end device methods disclosed herein.

According to a further aspect of the invention, there is provided a method performed by a proximity service server, the method comprising, receiving from a second proximity service server at least a first discovery key, a ProSe query code and a ProSe response code, generating a discovery filter based on the ProSe response code and sending the discovery filter, first discovery key and ProSe query code to a first end device, so that the first end device can securely discover a second end device over an air interface.

In one embodiment, the method comprises receiving from the first end device a match report request comprising a token based on a second discovery key and forwarding the token to the second proximity server for verification.

If the second proximity server verifies the token, the method may further comprise receiving a response from the second proximity indicating that the second end device is genuine.

In one embodiment, the method further comprises the proximity service server receiving a second discovery key from the second proximity service server and sending the second discovery key to the first end device.

In another embodiment, the method may further comprise, as a preliminary step, the proximity service server receiving a discovery request from the first end device indicating that the first end device wishes to discover the second end device of the second proximity service server.

In one embodiment, the method may comprise sending a discovery request to the second proximity service server indicating that the first end device wishes to discover the second end device of the second proximity service server.

According to another aspect of the invention, there is provided a server comprising a transmission unit for receiving from a second proximity service server at least a first discovery key, a ProSe query code and a ProSe response code, a generation unit for generating a discovery filter based on the ProSe response code and sending the discovery filter, first discovery key and ProSe query code to a first end device, so that the first end device can securely discover a second end device over an air interface.

According to yet another aspect of the invention, there is provided a network node comprising a processor and a memory, the memory containing instructions executable by the processor, such that the network node is operable to carry out any of the network node methods disclosed herein.

According to a further aspect of the invention, there is provided a method performed by an end device, the method comprising, receiving a ProSe query code and a first discovery key from a proximity service server, sending to a second end device a direct discovery request comprising a token based on the first discovery key, and receiving from the second end device a discovery response comprising a ProSe response code and a second token.

In one embodiment, the method comprises receiving from the proximity service server a discovery filter based on the ProSe response code.

In another embodiment, the method comprises the end device identifying the ProSe response code received from the second end device using the discovery filter.

In one embodiment, the end device may forward the second token to the proximity service server for verification.

If the second token is verified, the method may further comprise receiving a message from the proximity service server indicating that the second end device is genuine.

In an alternative embodiment, the method may comprise the end device receiving a second discovery key from the proximity service server and the end device verifying the second token using the second discovery key thereby authenticating the second end device.

In one embodiment, the method may comprise, as a preliminary step, sending to the proximity service server a discovery request indicating that the end device wishes to discover the second device.

In another embodiment, the end device may comprise a plurality of end devices such that the method further comprises, each end device receiving the same ProSe query code and first discovery key, and sending to the same second end device a direct discovery request and receiving from said same second end device a direct discovery response.

According to another aspect of the invention, there is provided an end device comprising a transmission unit for receiving a ProSe query code and a first discovery key from a proximity service server, and for sending to a second end device a direct discovery request comprising a token based on the first discovery key, and for receiving from the second end device a discovery response comprising a ProSe response code and a second token.

According to a further aspect, there is provided a computer program configured, when run on a computer, to carry out any of the methods disclosed herein.

According to yet another aspect of the invention, there is provided a computer program product comprising computer readable medium and a computer program as described above stored on the computer readable medium.

DETAILED DESCRIPTION

Figure 1:
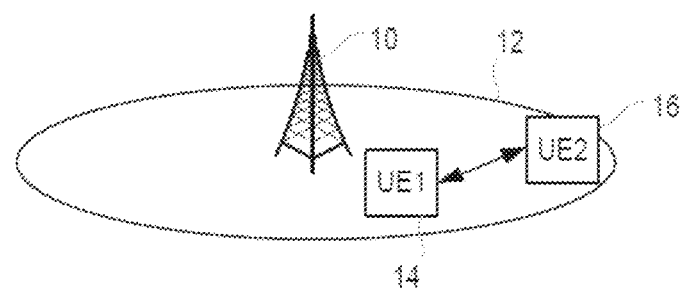
FIG. 1 illustrates a first network operating in accordance with an embodiment of the invention.

FIG. 1 illustrates a part of a cellular communications network, including a first base station 10, serving a cell 12, with a first wireless communications device (UE1) 14 and a second wireless communications device (UE2) 16 within the cell 12.

Figure 2:
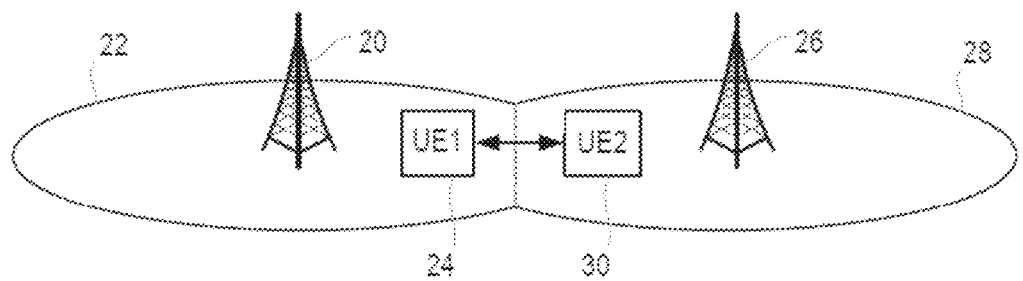
FIG. 2 illustrates a second network operating in accordance with an embodiment of the invention.

FIG. 2 illustrates a part of another cellular communications network, including a first base station 20, serving a first cell 22, with a first wireless communications device (UE1) 24 within the cell 22, and a second base station 26, serving a second cell 28, with a second wireless communications device (UE2) 30 within the cell 28.

In the examples described herein, the devices taking part in the methods are described as user equipment devices (UEs). It will be understood that this term is used to refer to user-operated portable communications devices, such as smartphones, laptop computers or the like, to other portable devices, such as tracking devices or the like, and to devices that are primarily intended to remain stationary in use, such as sensors, smart meters or the like. The term user equipment devices should also be understood to include wireless communication devices, end devices and terminal devices, and it is not limited to being a user-operated device.

In the examples shown in FIGS. 1 and 2, the networks form part of an Evolved UMTS Terrestrial Radio Access Network (E-UTRAN), as defined by the $3^{rd}$ Generation Partnership Project (3GPP). The 3GPP system provides the possibility of Proximity Services (ProSe) that can be used by User Equipment (UE) devices that are in proximity to each other. The ProSe system is described in 3GPP TS 22.278 and 3GPP TS 23.303. For example, the ProSe system allows the possibility of Device-to-Device (D2D) communication, without passing messages through the Radio Access Network.

One aspect of the ProSe system is the process of ProSe Discovery. The ProSe Discovery process identifies that ProSe-enabled UEs are in proximity of each other, using Evolved UMTS Terrestrial Radio Access (with or without using the E-UTRAN) or the Extended Packet Core (EPC) network, when permission, authorization and proximity criteria are fulfilled. The proximity criteria can be configured by the operator. One specific form of ProSe Discovery is ProSe Direct Discovery, which is a procedure employed by a ProSe-enabled UE to discover other ProSe-enabled UEs in its vicinity by using only the capabilities of the two UEs with E-UTRA technology.

The term ProSe-enabled UE refers to a UE that supports ProSe requirements and associated procedures. A ProSe-enabled UE may be either a non-Public Safety UE and/or a Public Safety UE.

FIGS. 1 and 2 show scenarios for D2D ProSe where UE1 and UE2 are each located in coverage of a cell, which may be the same cell 12 as shown in FIG. 1, or may be different cells 22, 28 as shown in FIG. 2. When UE1 has a role as a transmitter, UE1 sends a discovery message and UE2 receives it. The two devices UE1 and UE2 can change their roles as transmitter and receiver. The transmission from UE1 can be received by at least one other UE in addition to UE2.

The ProSe Discovery process can be used as a standalone process (i.e. it is not necessarily followed by ProSe Communication) or as an enabler for other services.

Figure 3:
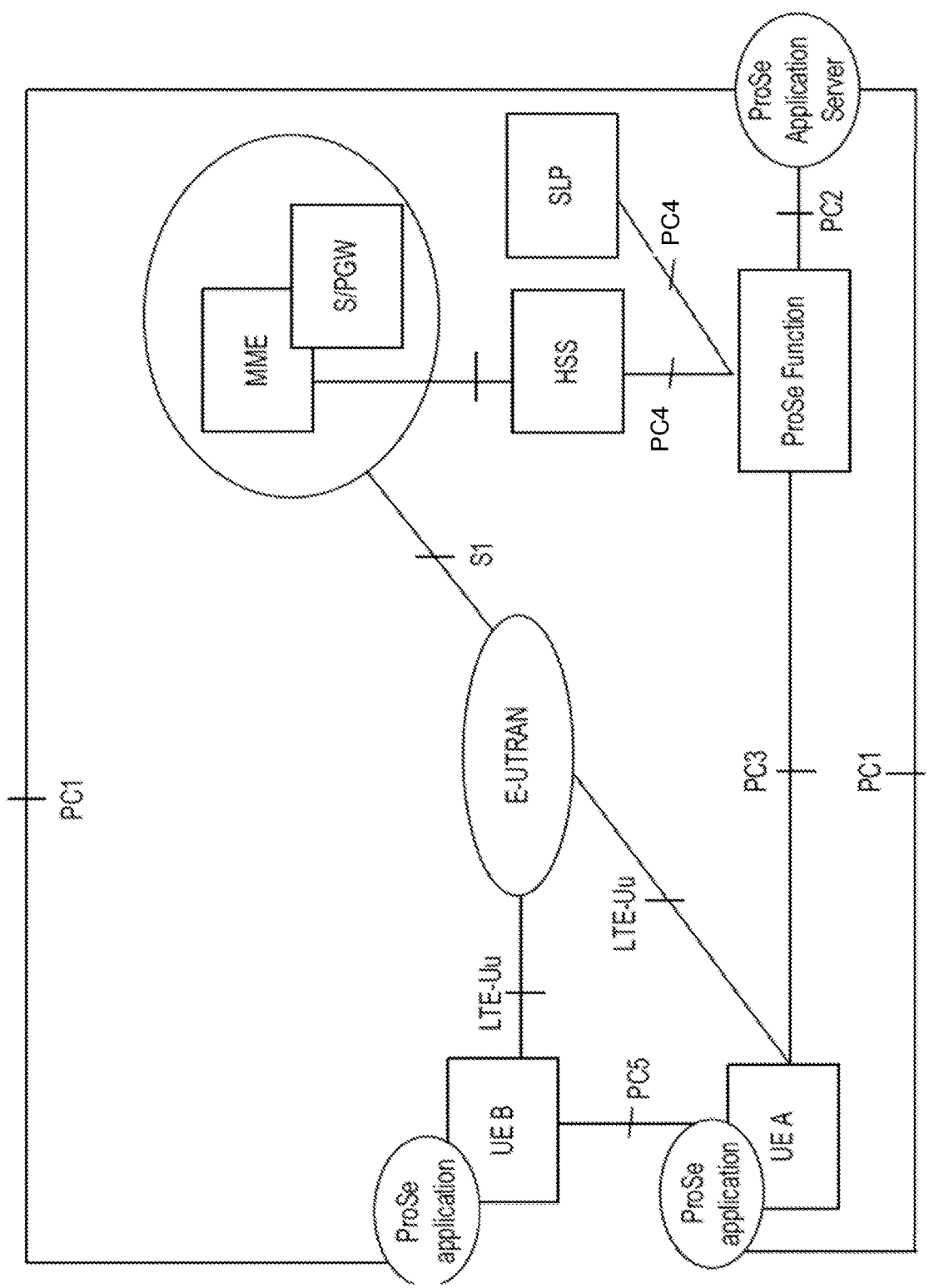
FIG. 3 illustrates the form of the network.

FIG. 3 is an illustration of the ProSe network architecture. In FIG. 3, it is assumed that two user equipment devices, UE A and UE B, subscribe to the same Public Land Mobile Network (PLMN).

The two user equipment devices, UE A and UE B, each have a respective connection over the LTE-Uu interface to the Evolved UMTS Terrestrial Radio Access Network (E-UTRAN). An S1 interface connects the E-UTRAN to an Evolved Packet Core (EPC) network, which includes a Mobility Management Entity (MME), Serving Gateway (SGW), Packet Gateway (PGW), Home Subscriber Server (HSS), and Secure User Plane Location (SUPL) Location Platform (SLP), amongst other network nodes.

The network also includes at least one Application server, which uses the ProSe capability for building the application functionality.

The core network also includes a ProSe Function, which provides functionality such as: Authorization and configuration of the UE for discovery and direct communication (controlled by the ProSe Function in the user's Home PLMN in the non-roaming case and by the Home PLMN or Visited PLMN ProSe Function in the roaming case); enabling the functionality of the EPC level ProSe discovery; handling and storing of ProSe related new subscriber data and ProSe identities; and security related functionality.

The ProSe Function has a PC3 reference point towards each UE, and has a PC4 reference point towards the EPC.

The ProSe Function also has a PC2 reference point towards at least one ProSe Application Server, which uses the ProSe capability for building the application functionality.

Each UE includes a ProSe application, which has a PC1 reference point towards the ProSe Application Server.

The UEs UE A and UE B use the PC5 reference point for control and user plane for discovery and communication, for relay and one-to-one communication (between UEs directly and between UEs over the LTE-Uu interface). The reference point PC5 is also referred to herein as an air interface between two UEs (UE A and UE B).

Figure 4:
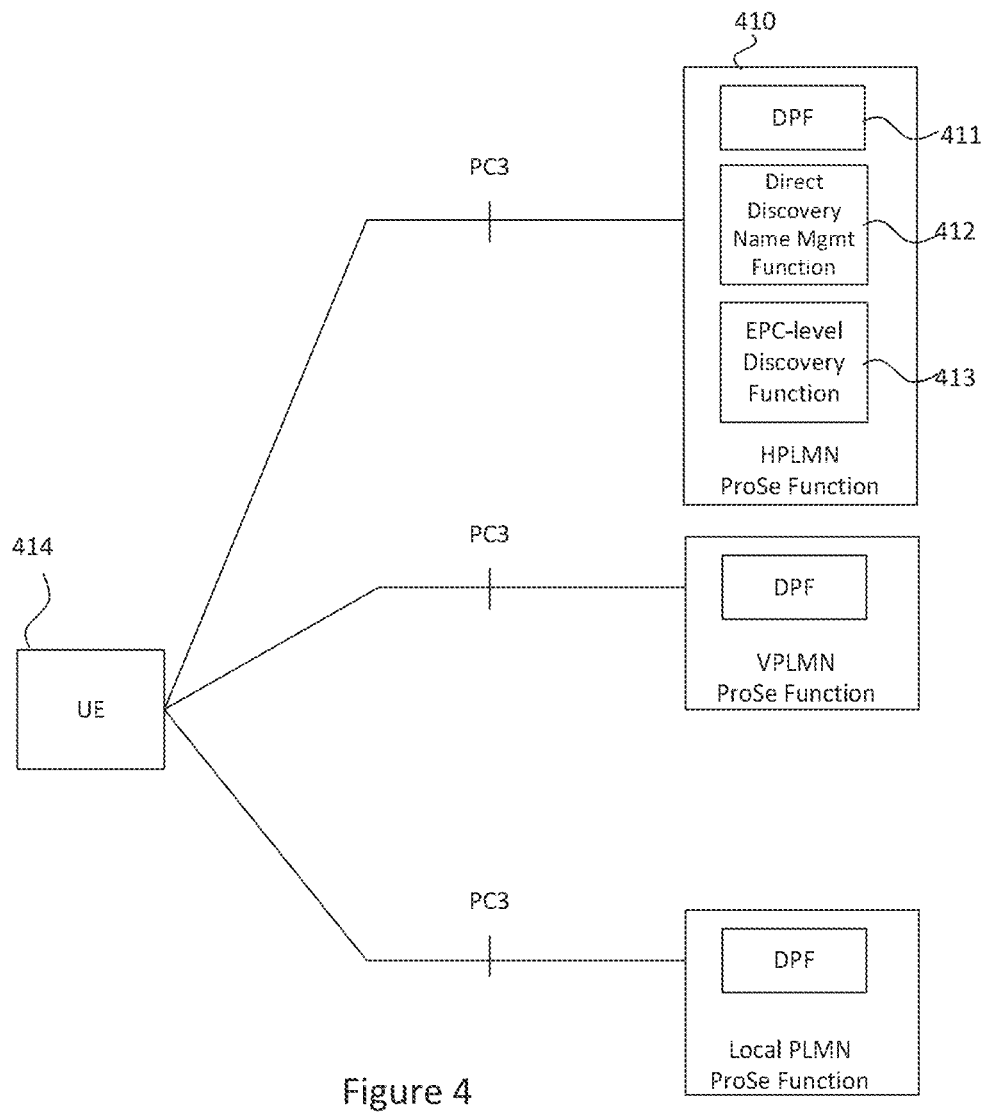
FIG. 4 illustrates ProSe functions and their interfaces with a UE.

FIG. 4 illustrates the ProSe function in more detail. The ProSe function 410 of a home public land mobile network (HPLMN) comprises three sub-functions: DPF 411, Direct Discovery Name Management function 412 and EPC-level discovery function 413. The Direct Discovery Name Management function is used for open Prose Direct Discovery to allocate and process mapping of ProSe Applications IDs and ProSe Application Codes used in ProSe Direct Discovery. It uses ProSe related subscriber data stored in home subscriber server (HSS) for authorization for each discovery request. It also provides the UE 414 with the necessary security material in order to protect discovery messages transmitted over the air interface PC5.

Figure 5:
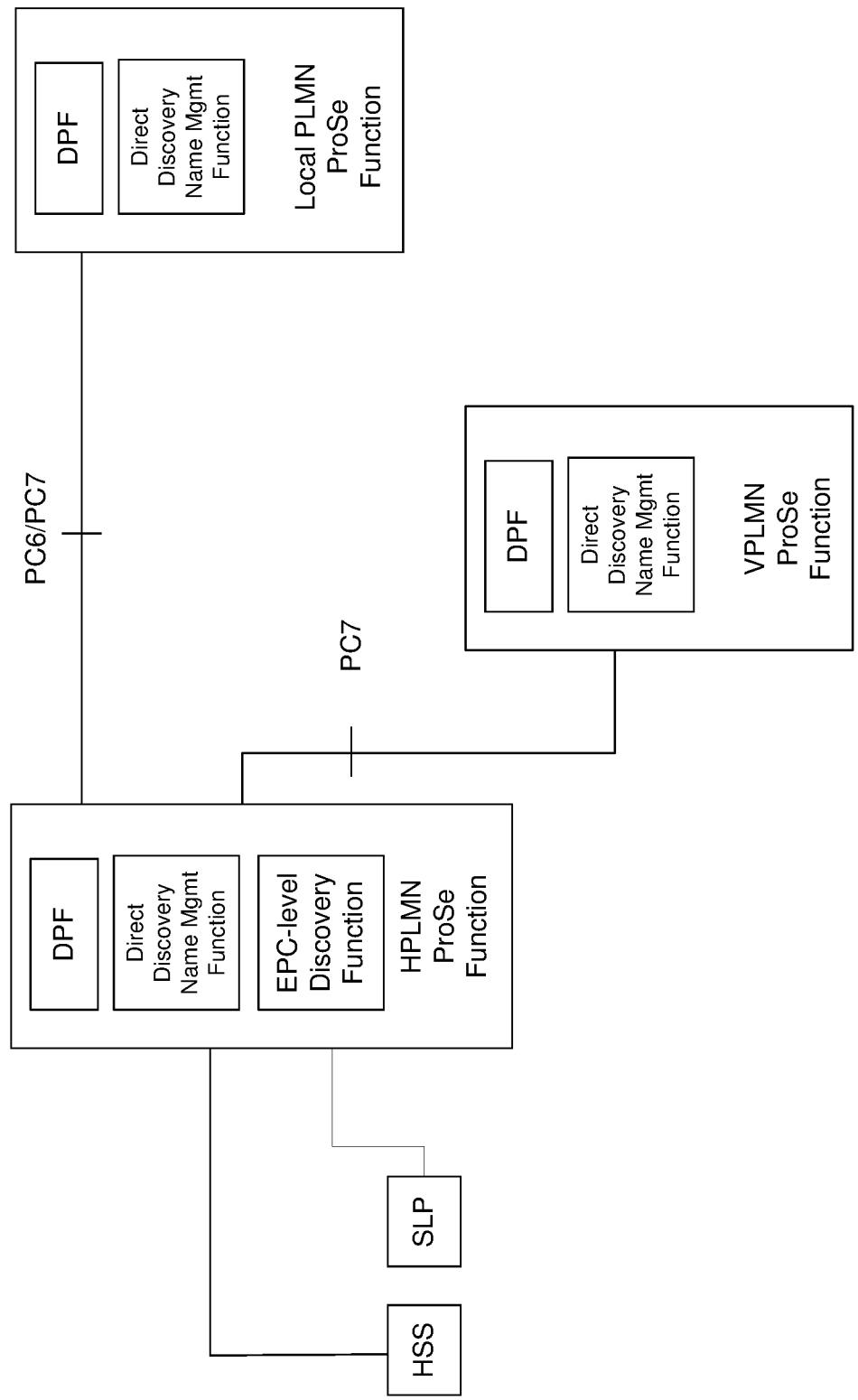
FIG. 5 illustrates ProSe functions and their interfaces.

FIG. 5 illustrates several ProSe functions of different public land mobile network (PLMN) and their interfaces. A home PLMN (HPLMN) 510 has a PC6 or PC7 reference point towards a local PLMN 511. The HPLMN 510 may also have a PC7 reference point towards a visited PLMN (VPLMN) 512.

In the ProSe direct discovery procedure there are two models: model A ("I am here") and model B ("who is there"/"are you there"). Model A defines two roles for ProSe-enabled UEs that are participating in ProSe Direct Discovery. One role is taken by an announcing UE which announces certain information that could be used by other UEs in its proximity that have permission to discover the announcing UE. The other role is taken by a monitoring UE which monitors certain information of interest in proximity of the announcing UE.

Model B defines two roles for ProSe-enabled UEs that are participating in ProSe Direct Discovery. A first role is taken by a Discoverer UE which transmits a request containing certain information about what it is interested to discover. The other role is taken by a Discoveree UE which receives the request message and can respond with information related to the discoverer UE's request. It should be understood that the two UEs may change roles.

The ProSe direct discovery procedure can be "open" or "restricted" discovery procedure. The ProSe Open Direct Discovery can be a standalone service enabler that can, for example, use information from a discoveree/announcing UE for certain applications in the discoverer/monitoring UE that are permitted to use this information. For example, the discoveree/announcing UE may be a taxi nearby and the discoverer/monitoring UE wants to find a nearby taxi. In other words, there is no or little restriction on who can discover whom.

In the ProSe restricted direct discovery procedure there is a restriction on who can discover whom. A Pro-Se enabled UE shall be able to be discoverable (discoveree/announcing UE) only by other Pro-Se enabled UEs (discoverer/monitoring UEs) in proximity of one another and that are explicitly permitted by the discoverable ProSe-enabled UE (discoveree/announcing UE). The ProSe restricted direct discovery allows permission defined at the application layer by the discoveree/announcing UE to determine the capability of the discoverer/monitoring UE to discover the discoveree/announcing UE.

It should be understood that both the open and the restricted ProSe Direct Discovery procedure can use model A or model B.

Referring now again to model B in more detail, when a discoverer UE wishes to discover a discoveree UE in its vicinity or proximity, the discoverer UE broadcasts a direct discovery Request message over the air interface (PC5) which includes a ProSe query code. (A ProSe query code is a code that is generated or allocated by the ProSe function in the home public land mobile network (HPLMN) and it enables the discoveree to identify the discoverer.) The discoveree UE listens for a discovery message and uses a discovery filter based on the ProSe query code in order to identify the direct discovery request message sent from the discoverer UE. When the discovery filter identifies a ProSe query code sent from a discoverer UE, the discoveree UE broadcasts a direct discovery response message over the air (PC5 interface) including a ProSe response code. The ProSe response code is allocated by the ProSe function to the discoveree UE.

Figure 6:
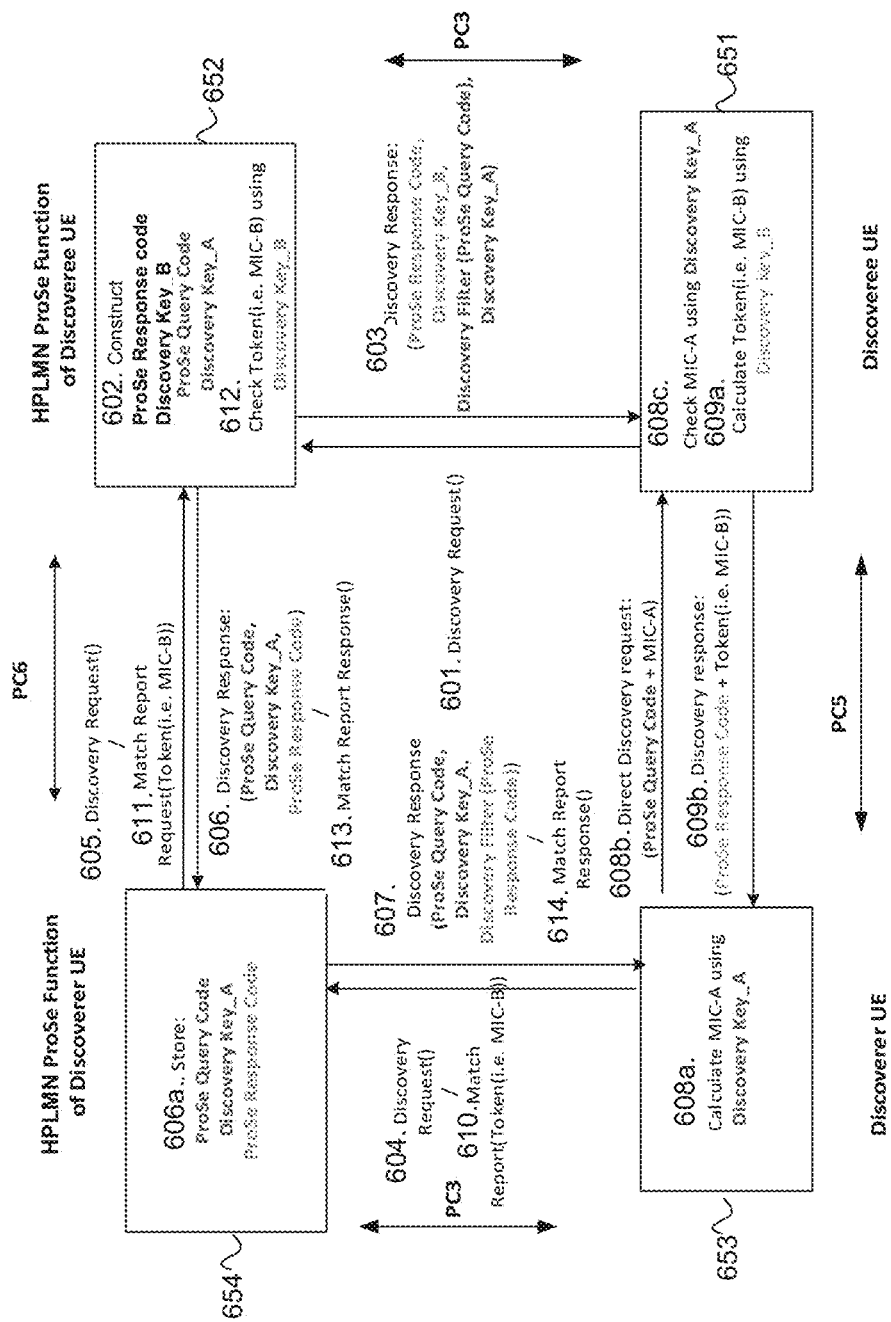
FIG. 6 illustrates an embodiment of the present invention.

An embodiment of the invention will now be described with reference to FIG. 6. In this embodiment, a discoveree UE 651, a home public land mobile network (HPLMN) ProSe function 652 of the discoveree UE, a discoverer UE 653 and a HPLMN ProSe function 654 of the discoverer UE exchange messages.

First, the discoveree UE 651 initiates a discovery request procedure with its HPLMN ProSe function 652, by sending a discovery request requesting that predetermined discoverer UEs in an application server (see FIG. 3) is allowed to discover said discoveree UE 651, step 601. The discoveree UE sends the request over the PC3 interface.

The HPLMN ProSe function 652 of the discoveree UE then generates or constructs a ProSe query code, ProSe response code, a discovery key A (first discovery key) and a discovery key B (second discovery key), step 602. However, in another unillustrated embodiment the HPLMN ProSe function 652 does not generate discovery keys A and B, instead it receives these keys from a key management server.

The ProSe function 652 also generates or prepares a discovery filter based on the ProSe query code. A discovery filter is a container of a ProSe query code, zero or more ProSe application mask(s) and time to live value(s) and its use will be explained in more detail below.

The ProSe function 652 then sends over the PC3 interface a discovery response comprising the ProSe response code, discovery key A, discovery key B and the discovery filter to the discoveree UE 651, step 603.

In the meantime, the discoverer UE 653 initiates a discovery request procedure with its HPLMN ProSe function 654 by sending over the PC3 interface to its HPLMN ProSe function 654 a discovery request to discover the discoveree UE 651, step 604. The HPLMN ProSe function 654 of the discoverer UE then sends a discovery request over the PC6 interface to the HPLMN ProSe function 652 of the discoveree UE, step 605. In response, the HPLMN ProSe function 652 of the discoveree UE sends a discovery response over the PC6 interface to the HPLMN ProSe function 654 of the discoverer UE, the discovery response comprises the ProSe query code, discovery key A and ProSe response code, step 606. The HPLMN ProSe function 654 of the discoverer UE may then store the ProSe query code, discovery key A and the ProSe response code, step 606a.

The HPLMN ProSe function 654 of the discoverer UE then configures or generates a discovery filter based on the ProSe response code, and then sends a discovery response to the discoverer UE 653, the discovery response comprising the ProSe query code, discovery key A and the discovery filter based on the ProSe response code, step 607.

Thereafter, the discoverer UE 653 calculates a token using discovery key A. The token may be a message integrity code (MIC). The MIC is calculated using the key derivation function (KDF) described in 3GPP TS 33.220 together with the discovery key A and a time value as input parameters, step 608a. This token is referred herein as MIC-A. The ProSe query code could also be used as an additional input parameter. It should be understood that the token is not limited to a MIC, in an alternative embodiment a message authentication code could be used instead.

When the discoverer UE 653 wishes to discover the discoveree UE 651 in its vicinity, the discoverer UE 653 broadcasts a direct discovery request message over the PC5 interface, 608b. The direct discovery request comprises the ProSe query code and MIC-A.

The discoveree UE 651 then hears the direct discovery request and using its discovery filter based on the ProSe query code, the discoveree UE 651 identifies or matches the ProSe query code received from the discoverer UE 653. When the discoveree UE 651 has made a match, it verifies the token by calculating MIC-A using the same discovery key A and time value, step 608c. If MIC-A matches the token received from the discoverer UE 653, the discoveree UE 651 knows that the discoverer UE is genuine and so can securely allow the discoverer UE 653 to discover said discoveree UE 651. In the next step the discoveree UE 651 calculates another token comprising a MIC based on discovery key B and a time value, step 609a. This token is referred herein as MIC-B. However, it should be understood that an alternative token can be used as discussed above in connection with discovery key A.

The discoveree UE 651 then sends a discovery response over the PC5 interface to the discoverer UE 653, step 609b. The discovery response comprises the ProSe response code and MIC-B (the other token based on discovery key B).

The discoverer UE 653 then hears the discovery response and by using its discovery filter based on the ProSe response code identifies or matches the ProSe response code sent from the discoveree UE 651. In order for the discoverer UE 653 to find out whether the discoveree UE 651 is genuine, the discoverer UE 653 initiates a match report procedure. It does so by sending a match report request to its HPLMN ProSe function 654 over the PC3 interface, step 610. The match report message comprises the token MIC-B. It may also comprise the ProSe response code. The HPLMN ProSe function 654 of the discoverer UE then forwards over the PC6 interface the match report request to the HPLMN ProSe function 652 of the discoveree UE, step 611.

The HPLMN ProSe function 652 of the discoveree UE then verifies the token by calculating MIC-B using discovery key B and the time value (step 612). If the MIC-B matches the token received from discoveree UE 651 via discoverer UE 653 and its HPLMN ProSe function 654, the ProSe function 652 of the discoveree UE sends a match report response to the HPLMN ProSe function 654 of the discoverer UE over the PC6 interface, step 613, and the HPLMN ProSe function 654 of the discoverer UE forwards the match report response to the discoverer UE 653, step 614. Upon receiving the match report response, the discoverer UE 653 knows that the discoveree UE 651 is genuine.

One of the advantages of this method is that as the discoveree UE 651 and the discoverer UE 653 share a discovery key (A) the discoveree UE 651 can verify the discoverer UE 653 such that the discoveree UE 651 knows that the discoverer UE 653 is genuine and not another imitating or false discoverer UE replaying the ProSe query code.

Furthermore, the discoveree UE 651 does not need to initiate a match report procedure with its HPLMN ProSe function when hearing a discovery request message that satisfies its discovery filter, instead the discoveree UE 651 itself can verify the token received in the discovery request message.

It is also advantageous that the discovery key B never leaves the ProSe function 652 of the discoveree UE. This means that the discoverer UE 653 cannot pretend to be the discoveree UE by replaying the ProSe response code to another discoverer UE.

Advantageously, this method can be applied to both open direct discovery procedure and restricted direct discovery.

Yet another advantage is that the discoveree UE 651 and the discoverer UE 653 can directly exchange ProSe query code and ProSe response code without requiring signaling to the network in between.

Figure 7:
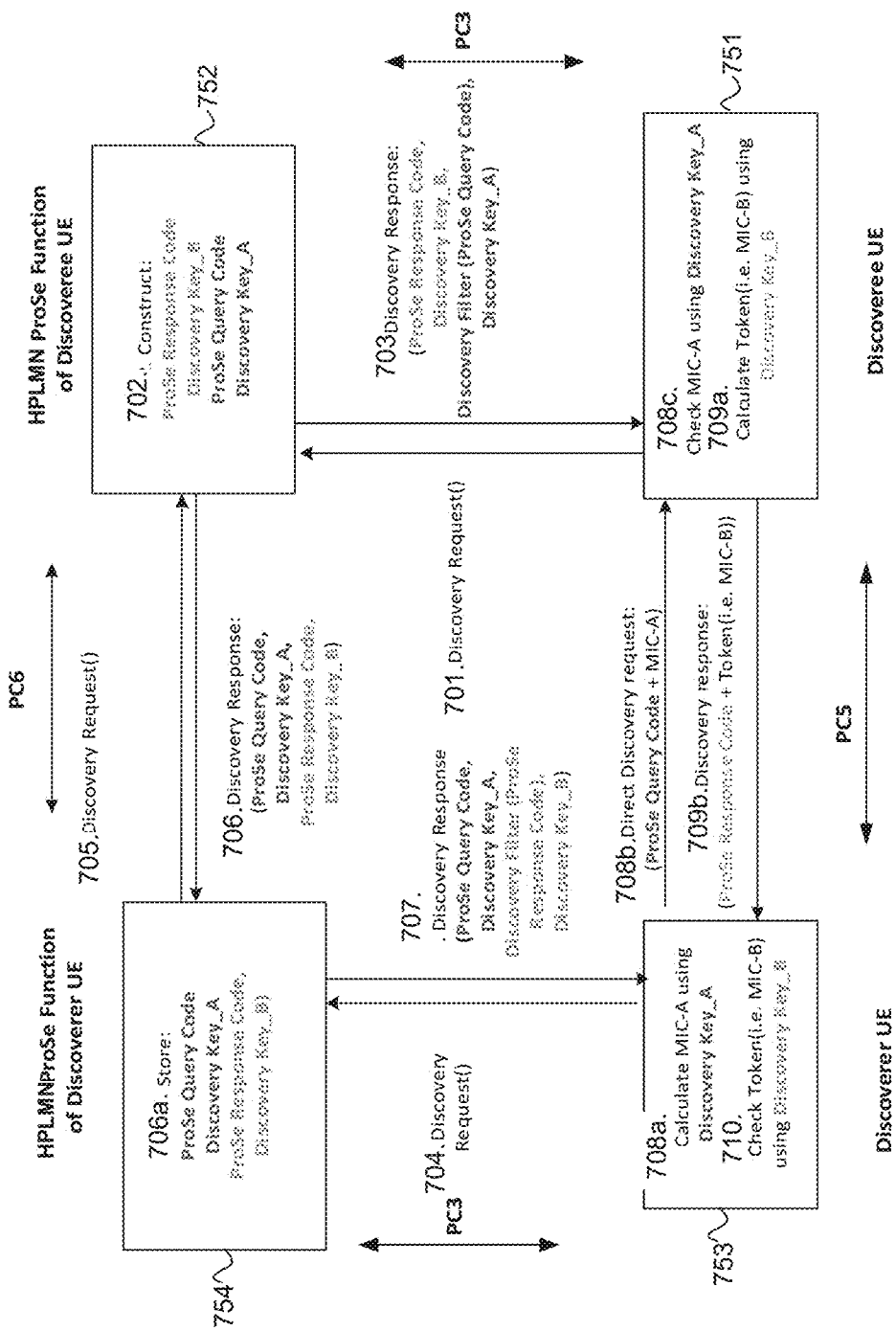
FIG. 7 illustrates another embodiment according to the present invention.

Another embodiment will now be described with reference to FIG. 7. This embodiment differs from that described with reference to FIG. 6 in that the HPLMN ProSe function of the discoveree UE forwards the discovery key B to the discoverer UE such that the discoverer UE does not need to initiate a match report process but can itself verify the MIC-B received from the discoveree UE.

In this embodiment, a discoveree UE 751, a home public land mobile network (HPLMN) ProSe function 752 of the discoveree UE, a discoverer UE 753 and a HPLMN ProSe function 754 of the discoverer UE exchange messages.

First, the discoveree UE 751 initiates a discovery request procedure with its HPLMN ProSe function 752, by sending a discovery request requesting that predetermined discoverer UEs in an application server (see FIG. 3) is allowed to discover said discoveree UE 751, step 701. The discoveree UE 751 sends the request over the PC3 interface.

The HPLMN ProSe function 752 of the discoveree UE then generates a ProSe query code, ProSe response code, a discovery key A (first discovery key) and a discovery key B (second discovery key), step 702. However, in another embodiment the HPLMN ProSe function 752 does not generate discovery keys A and B, instead it receives these keys from a key management server.

The HPLMN ProSe function 752 also generates a discovery filter based on the ProSe query code. As described previously, a discovery filter is a container of a ProSe query code, zero or more ProSe application mask(s) and time to live value(s) and its use will be explained in more detail below.

The ProSe function 752 then sends over the PC3 interface a discovery response comprising the ProSe response code, discovery key A, discovery key B and the discovery filter to the discoveree UE 751, step 703.

In the meantime, the discoverer UE 753 initiates a discovery request procedure with its HPLMN ProSe function 754 by sending over the PC3 interface to its HPLMN ProSe function 754 a discovery request to discover the discoveree UE 751, step 704. The HPLMN ProSe function 754 of the discoverer UE then sends a discovery request over the PC6 interface to the HPLMN ProSe function 752 of the discoveree UE, step 705. In response, the HPLMN ProSe function 752 of the discoveree UE sends a discovery response over the PC6 interface to the HPLMN ProSe function 754 of the discoverer UE, the discovery response comprises the ProSe query code, discovery key A, discovery key B and ProSe response code, step 706. The HPLMN ProSe function 754 of the discoverer UE may then store the ProSe query code, discovery key A, discovery key B and the ProSe response code, step 706a.

The HPLMN ProSe function 754 of the discoverer UE then configures a discovery filter based on the ProSe response code, and then sends a discovery response to the discoverer UE 753, the discovery response comprising the ProSe query code, discovery key A, discovery key B and the discovery filter based on the ProSe response code, step 707.

Thereafter, the discoverer UE 753 calculates a token using discovery key A. The token may be a message integrity code (MIC). The MIC is calculated using the key derivation function (KDF) described in 3GPP TS 33.220 together with the discovery key A and a time value as input parameters, step 708a. This token is referred herein as MIC-A. (The ProSe query code could also be used as an additional input parameter. It should be understood that the token is not limited to a MIC, in an alternative embodiment a message authentication code could be used instead.)

When the discoverer UE 753 wishes to discover the discoveree UE 751 in its vicinity, the discoverer UE 753 broadcasts a direct discovery request message over the PC5 interface, 708b. The direct discovery request comprises the ProSe query code and MIC-A.

The discoveree UE 751 then hears the direct discovery request and using its discovery filter based on the ProSe query code, the discoveree UE 751 identifies or matches the ProSe query code received from the discoverer UE 753. When the discoveree UE 751 has made a match, it verifies the token by calculating MIC-A using the same discovery key A and time value, step 708c. If MIC-A matches the token received from the discoverer UE 753, the discoveree UE 751 knows that the discoverer UE 753 is genuine and so can securely allow the discoverer UE 753 to discover said discoveree UE 751. It does so by further calculating another token comprising a MIC based on discovery key B and a time value, step 709a. This token is referred herein as MIC-B. However, it should be understood that an alternative token can be used as discussed above in connection with discovery key A.

The discoveree UE 751 then sends a discovery response over the PC5 interface to the discoverer UE 753, step 709b. The discovery response comprises the ProSe response code and MIC-B (the other token based on discovery key B).

The discoverer UE 753 then hears the discovery response and by using its discovery filter based on the ProSe response code identifies or matches the ProSe response code sent from the discoveree UE 751. In order for the discoverer UE 753 to find out whether the discoveree UE 751 is genuine, the discoverer UE 753 verifies the token by calculating MIC-B using discovery key B and the time value (i.e., checks the token using Key_B as shown in step 710). If the MIC-B matches the token received from discoveree UE 751, the discoverer UE 653 knows that the discoveree UE 751 is genuine, i.e. that the discoveree UE is not replaying a ProSe response code belonging to another discoveree UE.

This embodiment shares similar advantages to the embodiment described with reference to FIG. 6. For example, one of the advantages of this method is that as the discoveree UE 751 and the discoverer UE 753 share a discovery key (A) the discoveree UE 751 can verify the discoverer UE 753 such that the discoveree UE 751 knows that the discoverer UE 753 is genuine and not another imitating or false discoverer UE replaying the ProSe query code.

Furthermore, the discoveree UE 751 does not need to initiate a match report procedure with its HPLMN ProSe function when hearing a discovery request message that satisfies its discovery filter, instead the discoveree UE 751 itself can verify the token received in the discovery request message. Similarly, the discoverer UE 753 does not need to initiate a match report procedure upon hearing a discovery response message that satisfies its discovery filter. Instead the discoverer UE 753 itself can verify the token received from the discoveree UE 752.

Advantageously, this method can be applied to both open direct discovery procedure and restricted direct discovery.

Similar to the embodiment described with reference to FIG. 6, another advantage is that the discoveree UE 751 and the discoverer UE 753 can directly exchange ProSe query code and ProSe response code without requiring signaling to the network in between.

In both embodiments described with reference to FIGS. 6 and 7, it should be understood that the discoverer UE 653, 753 may be a group of discoverer UEs that all receive the same ProSe query code, discovery filter based on a particular ProSe response code, and a first discovery key. This is so that any of the discoverer UEs in the group can discover the discoveree UE. Thus, the first discovery key and the ProSe query code are not specific to a particular discoverer UE.

Alternatively, each discoverer UE of the group may additionally receive the same second discovery key so each UE upon receiving a discovery response 607, 707 from the discoveree UE 651, 751 can verify or authenticate said discoveree UE 651, 751.

Embodiments will now be described implementing the methods described with reference to FIGS. 6 and 7.

An embodiment of a method of a server will now be described with reference to FIG. 8. The server may be a proximity service server such as a ProSe function. The proximity service server is part of the same public land mobile network (PLMN) as a first end device (discoveree UE) and so can be considered to be the Home PLMN ProSe function of the first end device. The first end device and the proximity service server are transmitting information over PC3 interface. The proximity service server is also sending and receiving information to and from a second end device (discoverer UE) via another or second proximity service server or ProSe function of the same PLMN as the second end device. Thus, the second proximity service server can be considered to be a home PLMN ProSe function of the second end device (discoverer UE).

As mentioned, the method is performed by a server such as a proximity service server. The method comprises generating a ProSe query code and a ProSe response code 801, or allocating a ProSe query code and a ProSe response code to the first end device. In the next step, the proximity service server sends at least the ProSe response code together with a first and a second discovery key to the first end device 802. Thereafter, the proximity service server sends at least the first discovery key and the ProSe query code to a second end device 803 so to enable the second end device to securely discover the first end device over an air interface.

Another embodiment of this method will now be described with reference to FIG. 9. In this embodiment the proximity service server can either generate a first discovery key and a second discovery key 901, or alternatively, it can receive the two keys from a key management server 902. The proximity service server then generates a ProSe query code and a ProSe response code 903, or allocates these codes to a first end device. Thereafter, it sends at least the ProSe response code together with the first and second discovery key to the first end device 904. The proximity service server then receives a discovery request from a second end device indicating that the second end device wishes to discover the first end device over an air interface 905. In the next step, the proximity service server sends at least the first discovery key and the ProSe query code to the second end device 906 and then generates a discovery filter based on the ProSe query code and sends it to the first end device 907. The discovery filter based on the ProSe query code can alternatively be sent to the first end device together with the ProSe response code, first and second discovery keys as set out in step 904. The proximity service server then also sends the ProSe response code to a second proximity service server with which the second end device is in communication 908. (This is so that the second proximity service server can generate the discovery filter based on the ProSe response code, instead of the proximity service server.) In the next step, the proximity service server receives a match report request comprising a token based on the second discovery key, as well as the ProSe response code from the first end device via the second end device 909. It then verifies the token using the second discovery key 910, and then responds by sending a match report response to the second end device indicating that the first end device is genuine 911. In one embodiment, step 912, the second end device comprises a plurality of second end devices such that the method further comprises sending the ProSe query code and the first discovery key to each second end device as set out in step 906.

Another embodiment will now be described with reference to FIG. 10. This embodiment 1000 differs from the embodiments described with reference to FIG. 9 in that the proximity service server also sends the second discovery key to the second end device such that the second end device can verify or authenticate the first end device without sending a match report request.

Figure 9:
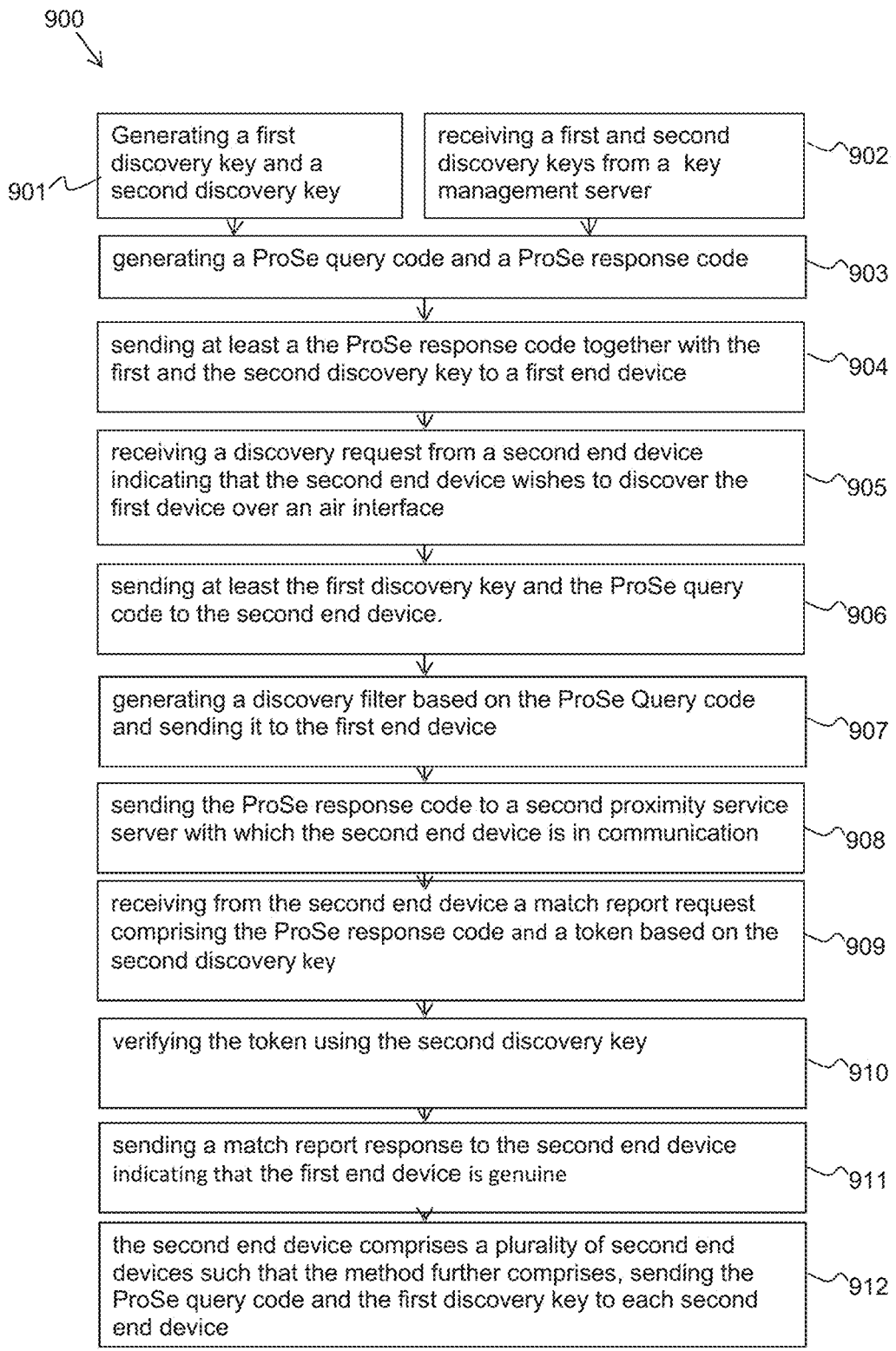
FIG. 9 is a flow chart illustrating method steps according to another embodiment of the invention performed by a server.

The first steps 1001, 1002, 1003, 1004, 1005, 1006, correspond to steps 901, 902, 903, 904, 905, and 906 in FIG. 9 and so will not be described in detail. In step 1007, the proximity service server sends the second discovery key to the second end device. The proximity service server also generates a discovery filter based on the ProSe query code and sends it to the first end device 1008, similar to step 907 in FIG. 9. It also sends the ProSe response code to a second proximity service server with which the second end device is in communication 1009. (This is so that the second proximity service server can generate the discovery filter based on the ProSe response code, instead of the proximity service server.) In yet another embodiment, step 1010, the second end device comprises a plurality of second end devices such that the method further comprises sending the ProSe query code, the first discovery key and the second discovery key to each end device as set out in step 1006 and 1007.

Figure 11:
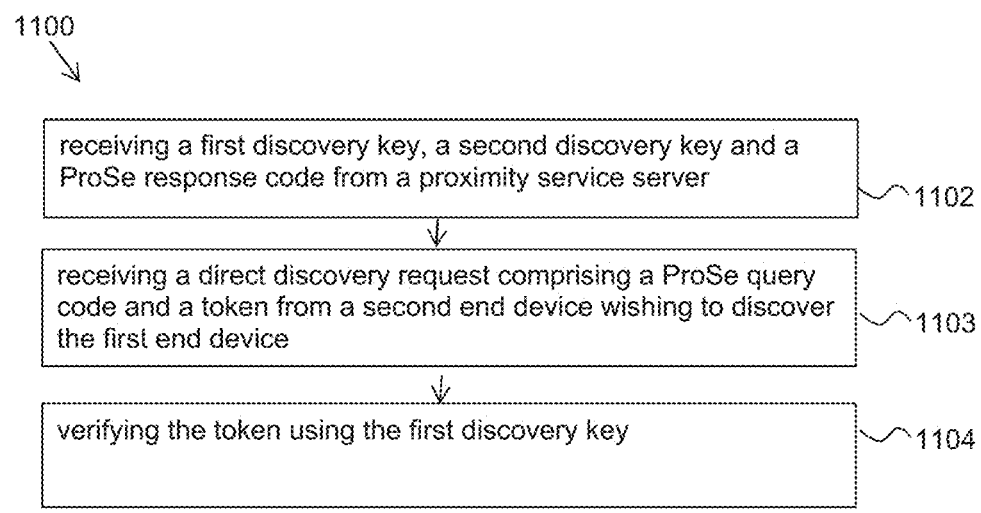
FIG. 11 is a flow chart illustrating method steps according to an embodiment of the invention performed by an end device.

Another aspect of the invention will now be described with reference to FIG. 11. FIG. 11 illustrates a method 1100 performed by an end device (discoveree UE). The end device communicates with its proximity service server or HPLMN ProSe function over PC3 interface. The end device also communicates with a second end device (discoverer UE) over air interface PC5.

In the method, the end device receives a first discovery key, a second discovery key and a ProSe response code from a proximity service server, 1102. The end device also receives a direct discovery request comprising a ProSe query code and a token from a second end device wishing to discover the end device, 1103. The end device then verifies the token using the first discovery key, 1104.

Figure 12:
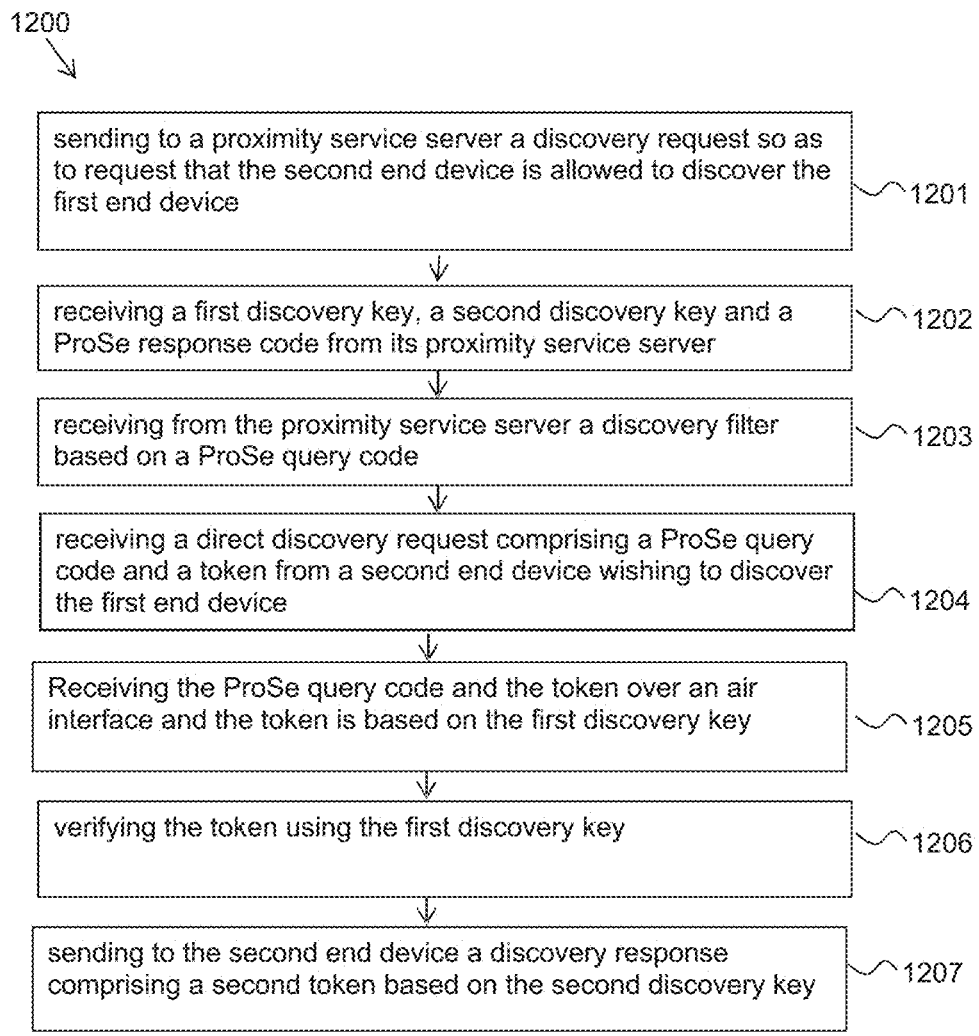
FIG. 12 is a flow chart illustrating method steps according to a further embodiment of the invention performed by an end device.

FIG. 12 illustrates another embodiment wherein a method 1200 is carried out or performed by an end device. In this method, the end device sends to a proximity service server a discovery request so as to request that the second end device is allowed to discover the end device, 1201. The end device then receives a first discovery key, a second discovery key and a ProSe response code from its proximity service server, 1202. It also receives a discovery filter based on a ProSe query code from the proximity service server, 1203. Thereafter, the end device receives a direct discovery request comprising a ProSe query code and a token from a second end device wishing to discover the end device, 1204. The end device may receive the ProSe query code and the token over an air interface and the token is based on the first discovery key, 1205. Thereafter, the end device verifies the token using the first discovery key, 1206. If verified successfully, the end device sends to the second end device a discovery response comprising a second token based on the second discovery key, 1207.

Figure 13:
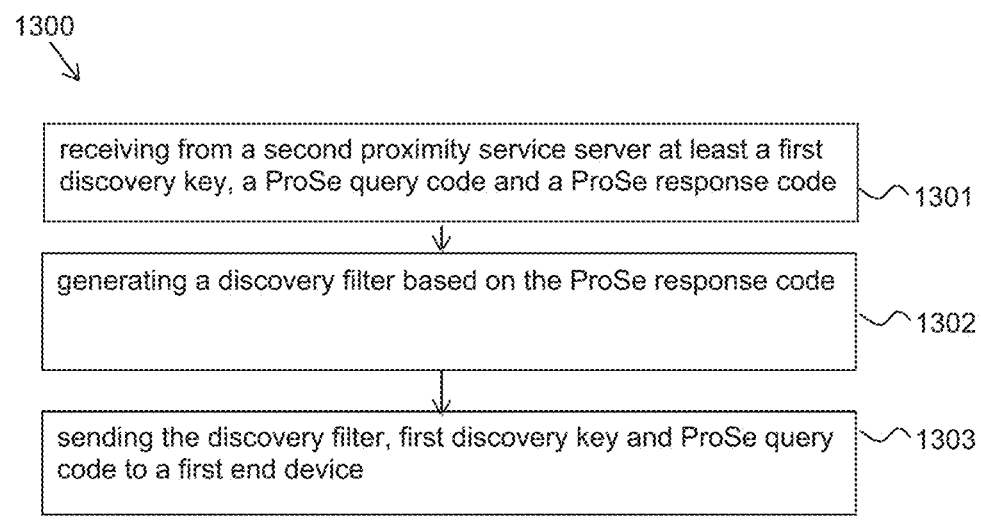
FIG. 13 is a flow chart illustrating method steps according to an embodiment of the invention performed by a server.

Another embodiment of the invention will now be described with reference to FIG. 13. FIG. 13 shows a method of a server such as a proximity service server which may be a ProSe function. The proximity service server is part of the same public land mobile network (PLMN) as a first end device (discoverer UE) and so can be considered to be the Home PLMN ProSe function of the first end device. The first end device and the proximity service server are transmitting information over PC3 interface. The proximity service server is also sending and receiving information to and from a second proximity service server or ProSe function of the same PLMN of a second end device (discoveree UE). Thus, the second proximity service server can be considered to be a home PLMN ProSe function of the second end device.

In this method 1300, the proximity service server receives from a second proximity service server at least a first discovery key, a ProSe query code and a ProSe response code, 1301. It then generates a discovery filter based on the ProSe response code, 1302, and thereafter sends the discovery filter, first discovery key and the ProSe query code to a first end device 1303.

Another embodiment will now be described with reference to FIG. 14. This method 1400 is also performed by a server such as a proximity service server similar to that performing method 1300. The proximity service server receives a discovery request from a first end device (discoverer UE) indicating that the first end device wishes to discover a second end device (discoveree UE) of a second proximity service server, 1401. The proximity service server then sends or forwards a discovery request to the second proximity service server indicating that the first end device wishes to discover the second end device of the second proximity service server, 1402. The proximity service server then receives from the second proximity service server at least a first discovery key, ProSe query code and a ProSe response code, 1403. In the next step 1404, the proximity service server generates a discovery filter based on the ProSe response code. Thereafter the proximity service server sends the discovery filter, first discovery key and ProSe query code to the first end device (as shown in step 1405).

In one alternative, the proximity service server then receives from the first end device a match report request comprising a token based on a second discovery key, and then forwards the token to the second proximity server for verification, 1406. If the second proximity service server verifies the token, the method further comprises receiving a response from the second proximity server authenticating the second end device, i.e. the proximity service server informs the first end device that the second end device is genuine, 1407.

In another alternative, the proximity service server does not receive and forward a token. Instead, it receives a second discovery key from the second proximity service server and sends or forwards this second discovery key to the first end device, 1408. By doing so, the first end device can itself verify or authenticate the second end device.

Figure 15:
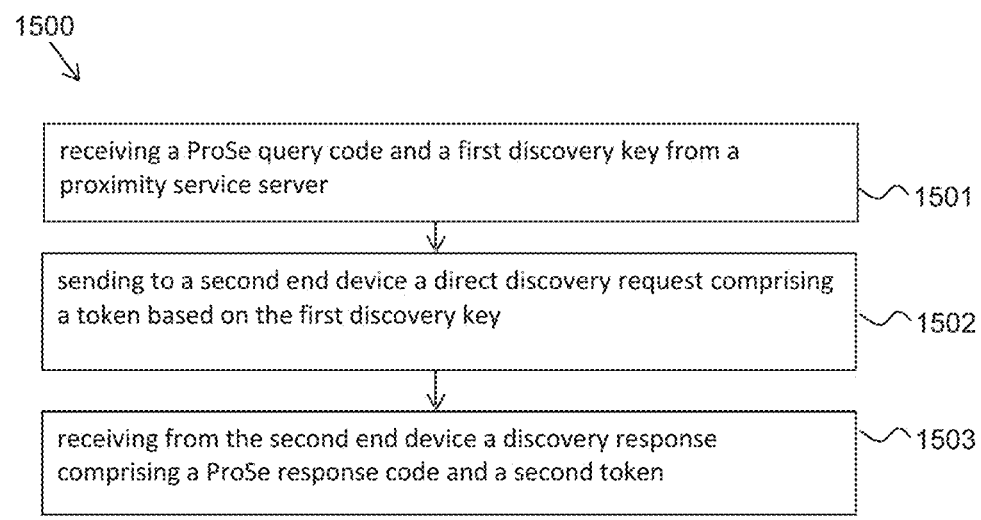
FIG. 15 is a flow chart illustrating method steps according to an embodiment of the invention performed by an end device.

In FIG. 15 a method 1500 is shown that is performed by an end device (discoverer). The end device communicates with its proximity service server or HPLMN ProSe function over PC3 interface. The end device also communicates with a second end device (discoveree) over air interface PC5.

In the method 1500, the end device receives a ProSe query code and a first discovery key from a proximity service server, 1501. It then sends to a second end device a direct discovery request comprising a token based on the first discovery key, 1502. In the next step 1503, the end device receives from the second end device a discovery response comprising a ProSe response code and a second token, 1503.

Figure 16:
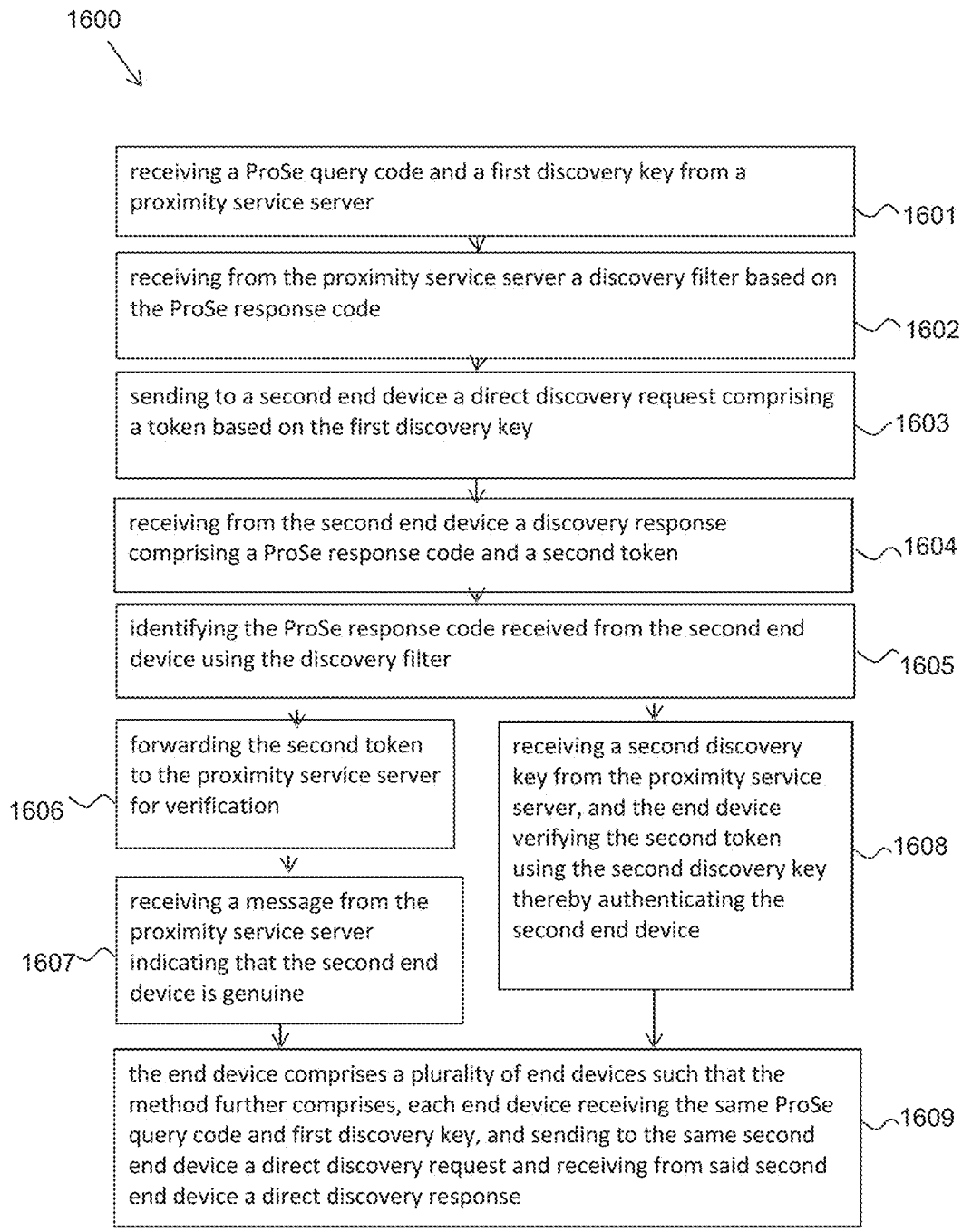
FIG. 16 is a flow chart illustrating method steps according to another embodiment of the invention performed by an end device.

Another embodiment of the method 1600 will now be described with reference to FIG. 16. This method is performed by an end device (discoverer) similar to that performing method 1500.

In this method 1600, the end device, receives a ProSe query code and a first discovery key from a proximity service server, 1601. It also receives a discovery filter based on the ProSe response code, 1602. The end device then sends to a second end device (discoveree UE) a direct discovery request comprising a token based on the first discovery key, 1603. In response it receives from the second end device a discovery response comprising a ProSe response code and a second token, 1604. The end device then identifies the ProSe response code received from the second end device using the discovery filter, 1605.

There are then two alternatives of this embodiment. In a first alternative, the end device forwards the second token to its proximity service server for verification, 1606. If successfully verified, the end device receives a message from its proximity service server indicating that the second end device is genuine, 1607. Although not shown in the drawing, the verification of the token occurs in another proximity service server, namely that of the second end device (discoveree).

In the second alternative, the end device does not send or receive a match report, instead it receives a second discovery key from the proximity service server and the end device verifies the second token using the second discovery key thereby authenticates or verifies that the second end device is genuine, 1608.

For the various embodiments of method 1600, it should be realized that the end device performing the method 1600 may be a plurality of end devise such that the method further comprises each end device receiving the same ProSe query code and first discovery key, and sending to the same second end device a direct discovery request and receiving from said second end device a direct discovery response, 1609.

The embodiments of methods 800, 900, 1000, 1100, 1200, 1300, 1400, 1500 and 1600 all enjoy the advantages of respective embodiments described with reference to FIGS. 6 and 7.

Figure 17:
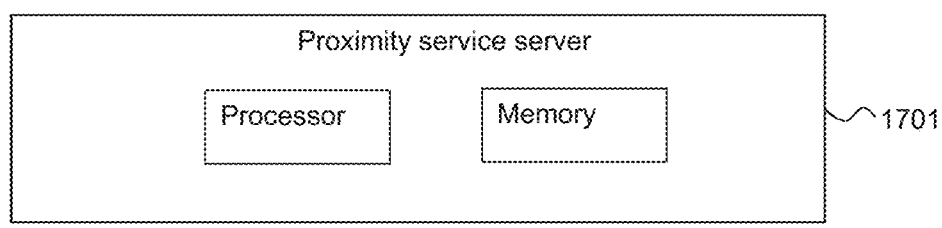
FIG. 17 is a block diagram illustrating a server.
Figure 18:
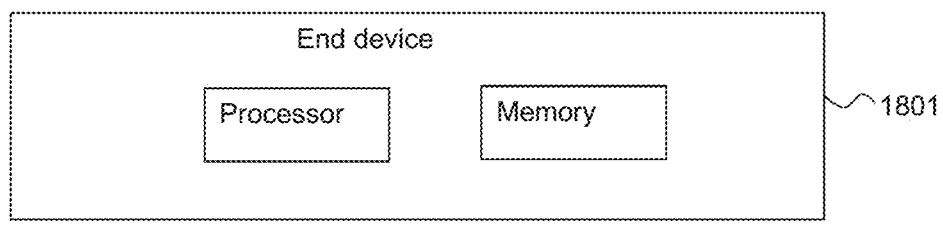
FIG. 18 is a block diagram illustrating an end device.

The methods described above may be conducted in a server such as a proximity service server of an end device which may be a UE, or in an end device itself. The methods may be conducted on receipt of suitable computer readable instructions, which may be embodied within a computer program running on the proximity service server or the end device. FIGS. 17 and 18 illustrate an example of a proximity service server 1701 and an end device 1801 which may execute methods of the present invention, for example on receipt of suitable instructions from a computer program.

Referring to FIGS. 17 and 18 each of the proximity service server and end device comprises a processor and a memory. The memory containing instructions executable by the processor, such that the proximity service server is operable to carry out any of the embodiments of methods 800, 900, 1000, 1300 and 1400 and/or that the end device is operable to carry out any of the embodiments of methods 1100, 1200, 1500 and 1600.

Figure 19:
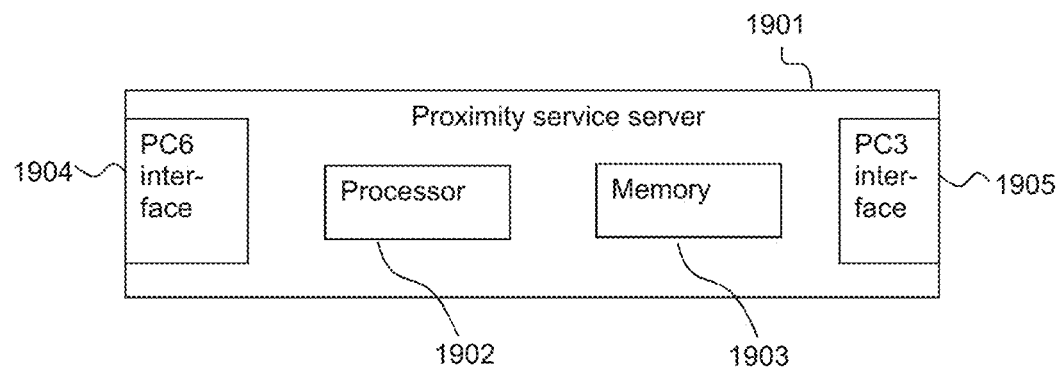
FIG. 19 is a block diagram illustrating a server.

In FIG. 19 an embodiment of a server 1901 is shown. The server 1901 may be a proximity service server or a ProSe function of an end device that acts as a discoveree. The server comprises a PC6 interface 1904 on which it communicates with other proximity service servers or ProSe functions of end devices acting as discoverers. The server further comprises a PC3 interface 1905 on which it communicates with its end device (discoveree) belonging to the same PLMN. The server 1901 comprises a processor 1902 and a memory 1903. The memory containing instructions executable by the processor, such that the proximity service device is configured to generate a ProSe query code and a ProSe response code, sending at least the ProSe response code together with a first and a second discovery key to a first end device, and sending at least the first discovery key and the ProSe query code to a second end device so that the second end device can securely discover the first end device over an air interface.

The server 1901 may also be configured to generate the first discovery key and the second discovery key, or receiving the first and second discovery keys from a key management server.

In one embodiment, the server is configured to generate a discovery filter based on the ProSe Query code and sending it to the first end device.

In one embodiment, the server 1901 is configured to receive a discovery request from the second end device indicating that the second end device wishes to discover the first end device over an air interface, the proximity service server thereafter sends the first discovery key and ProSe query code to the second end device.

The server 1901 may also be configured to send the ProSe response code to a second proximity service server with which the second end device is in communication.

In one embodiment, the server 1901 is configured to receive from the second end device a match report request comprising the ProSe response code and a token based on the second discovery key. The server may further be configured to verifying the token using the second discovery key. If the token is verified, the server may be configured to sending a match report response to the second end device indicating that the first end device is genuine.

In an alternative embodiment, the server 1901 may be configured to send the second discovery key to the second end device so that the second end device can verify that the first end device is genuine.

It should be understood that the server can be configured such that it sends the same ProSe query code and the same first discovery key to several second end devices belonging to a group. Each second end device can thereafter send a direct discovery request to the same first end device (discoveree). Thus the ProSe query code and the first discovery key is not specific to a particular second end device.

Figure 20:
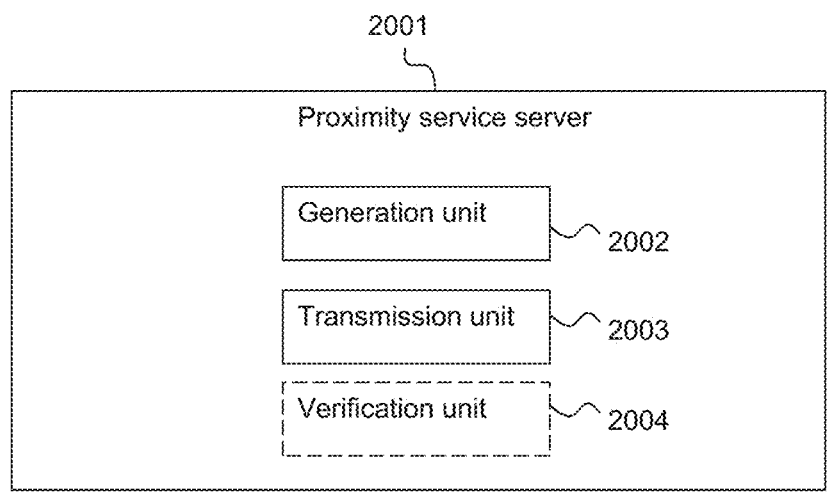
FIG. 20 is a block diagram illustrating another example of a server.

FIG. 20 illustrates functional units in another embodiment of a proximity service server 2001 or ProSe function of a first end device (discoveree) which may execute any of the methods 800, 900, 1000 described herein, for example according to computer readable instructions received from a computer program. It will be understood that the units illustrated in FIG. 20 are software implemented functional units, and may be realised in any appropriate combination of software modules.

Referring to FIG. 20, the proximity service server 2001 comprises a generation unit 2002 for generating a ProSe query code and a ProSe response code, a transmission unit 2003 for sending at least the ProSe response code together with a first and a second discovery key to a first end device, and for sending at least the first discovery key and the ProSe query code to a second end device, so that the second end device can securely discover the first end device over an air interface.

The proximity service server 2001 also comprises a processor for executing the software or units and a memory for storing the different units.

The generation unit 2002 may also comprise means for generating the first discovery key and the second discovery key. Alternatively, the transmission unit 2003 receives the first and second discovery keys from a key management server.

The generation unit 2002 may further comprise means for generating a discovery filter based on the ProSe Query code and sending it to the first end device.

The transmission unit 2003 may comprise means for receiving a discovery request from the second end device indicating that the second end device wishes to discover the first end device over an air interface. It may also be for sending the ProSe response code to a second proximity service server with which the second end device is in communication. The transmission unit 2003 may also comprise means for receiving from the second end device a match report request comprising the ProSe response code and a token based on the second discovery key.

The proximity service server may further comprise a verification unit 2004 for verifying the token using the second discovery key. This is shown in dashed lines in FIG. 20 so as to indicate that this unit is optional.

In an alternative embodiment, the proximity service server 2001 does not comprise a verification unit 2004. In this embodiment, the transmission unit 2003 comprises means for sending the second discovery key to the second end device so that the second discovery key can itself verify the first end device. In this embodiment, the transmission unit does not receive a match report request or send a match report response.

The transmission unit 2003 described above can be for sending and receiving information as described above to a group of second end devices such that the transmission unit sends the same ProSe query code and first discovery key to several members of the group. It may also send the second discovery key to several members of the group.

In some examples, the transmission unit 2003, verification unit 2004 and the generation unit 2002 may be implemented with help from a computer program which, when run on a processor, causes the transmission unit, verification unit and the generation unit to cooperate to carry out examples of the method 800, 900, 1000 described above.

Figure 21:
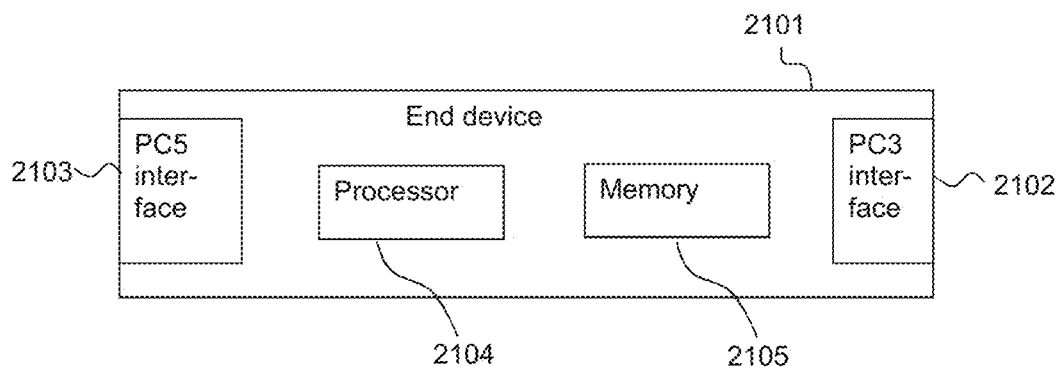
FIG. 21 is a block diagram illustrating an example of an end device

FIG. 21 illustrates an end device 2101 which may act as a discoveree. The end device comprises a PC3 interface 2102 to communicate with its proximity service server or ProSe function. The end device also comprises a PC5 interface 2103 with which it communicates with a second end device (discoverer). The end device 2101 further comprises a processor 2104 and a memory 2105. The memory containing instructions executable by the processor, such that the end device is configured to receive a first discovery key, a second discovery key and a ProSe response code from a proximity service server, receive a direct discovery request comprising a ProSe query code and a token from a second end device wishing to discover the end device, and verifying the token using the first discovery key.

The end device may further be configured to receive from the proximity service server a discovery filter based on a ProSe query code, the discovery filter being used to identify the ProSe query code received from the second end device. The first end device may also be configured so that it receives the ProSe query code and the token over an air interface and the token is based on the first discovery key.

In one embodiment, the end device is configured to verify the token received from the second end device, the method further comprises sending to the second end device a discovery response comprising a second token based on the second discovery key. The end device may also be configured so as a preliminary step it sends to its proximity service server a discovery request so as to request that the second end device is allowed to discover said end device.

Figure 22:
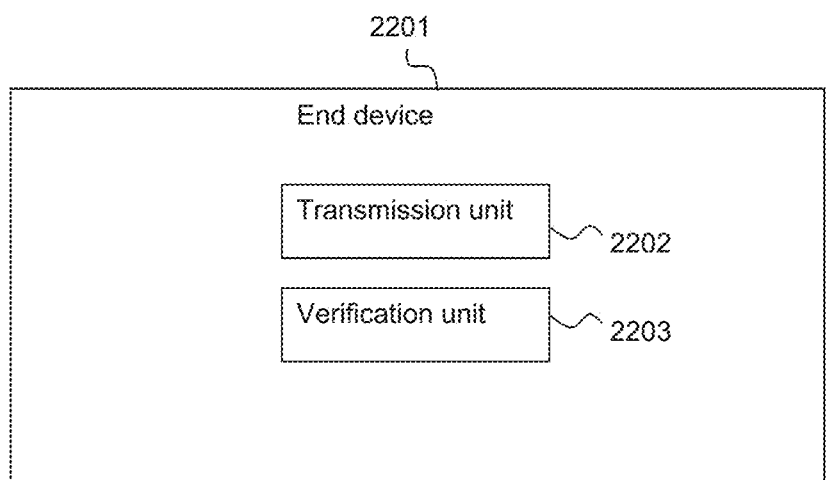
FIG. 22 is a block diagram illustrating another example of an end device.

FIG. 22 illustrates functional units in another embodiment of an end device 2201 (discoveree) which may execute any of the methods 1100 and 1200 described herein, for example according to computer readable instructions received from a computer program. It will be understood that the units illustrated in FIG. 22 are software implemented functional units, and may be realised in any appropriate combination of software modules.

Referring to FIG. 22, the end device 2201 comprises a transmission unit 2202 for receiving a first discovery key, a second discovery key and a ProSe response code from a proximity service server, and receiving a direct discovery request comprising a ProSe query code and a token from a second end device (discoverer UE) wishing to discover the end device. The end device 2201 further comprises a verification unit 2203 for verifying the token using the first discovery key.

The transmission unit 2202 may further comprise means for receiving from the proximity service server a discovery filter based on a ProSe query code, the discovery filter being used to identify the ProSe query code received from the second end device. The end device may comprise an identification module (not shown) for using the discovery filter to identify the ProSe query code.

The transmission unit may also comprise means for receiving the ProSe query code and the token over an air interface and the token is based on the first discovery key.

If the verification unit 2203 verifies the token received from the second end device, the transmission unit 2204 may further comprise means for sending to the second end device a discovery response comprising a second token based on the second discovery key.

It should also be realised that the transmission unit 2202 may further comprise means for sending to its proximity service server a discovery request so as to request that the second end device is allowed to discover said end device.

In some examples, the transmission unit 2202 and the verification unit 2203 may be implemented with help from a computer program which, when run on a processor, causes the transmission unit and the verification unit to cooperate to carry out examples of the method 1100 and 1200 described above.

Figure 23:
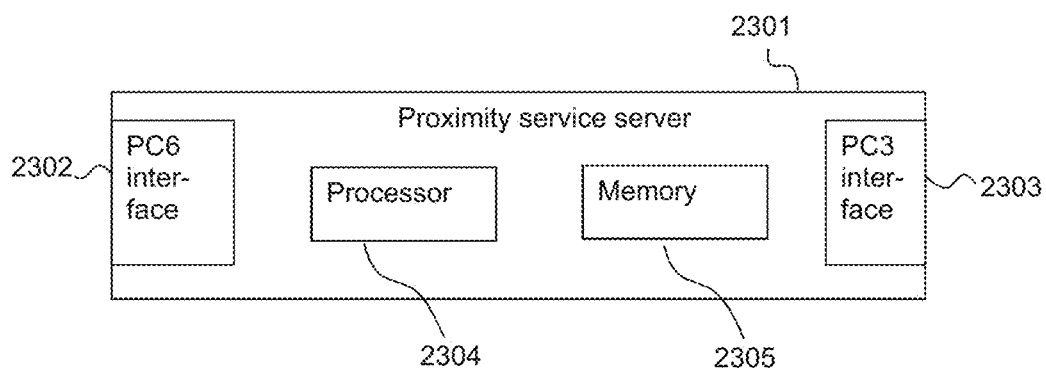
FIG. 23 is a block diagram illustrating an example of a server.

In FIG. 23 an embodiment of another server 2301 is disclosed. The server 2301 may be a proximity service server or a ProSe function of an end device that acts as a discoverer. The server 2301 comprises a PC6 interface 2302 on which it communicates with other proximity service servers or ProSe functions of end devices acting as a discoveree. The server further comprises a PC3 interface 2303 on which it communicates with its end device (discoverer) belonging to the same PLMN. The server 2301 comprises a processor 2304 and a memory 2305. The memory 2305 containing instructions executable by the processor, such that the proximity service device is configured to receive from a second proximity service server at least a first discovery key, a ProSe query code and a ProSe response code, generate a discovery filter based on the ProSe response code and sending the discovery filter, first discovery key and ProSe query code to a first end device, so that the first end device (discoverer UE) can securely discover a second end device (discoveree UE) over an air interface.

The server 2301 may be further configured to receive from the first end device a match report request comprising a token based on a second discovery key and forwarding the token to the second proximity server for verification. If the second proximity server verifies the token, the server 2301 is further configured to receive a response from the second proximity indicating that the second end device is genuine.

In an alternative embodiment, the server 2301 may be configured to receive a second discovery key from the second proximity service server and sending the second discovery key to the first end device.

The server 2301 may be configured to receive a discovery request from the first end device indicating that the first end device wishes to discover the second end device of the second proximity service server.

In yet another embodiment, the server 2301 may be configured to send a discovery request to the second proximity service server indicating that the first end device wishes to discover the second end device of the second proximity service server.

Figure 24:
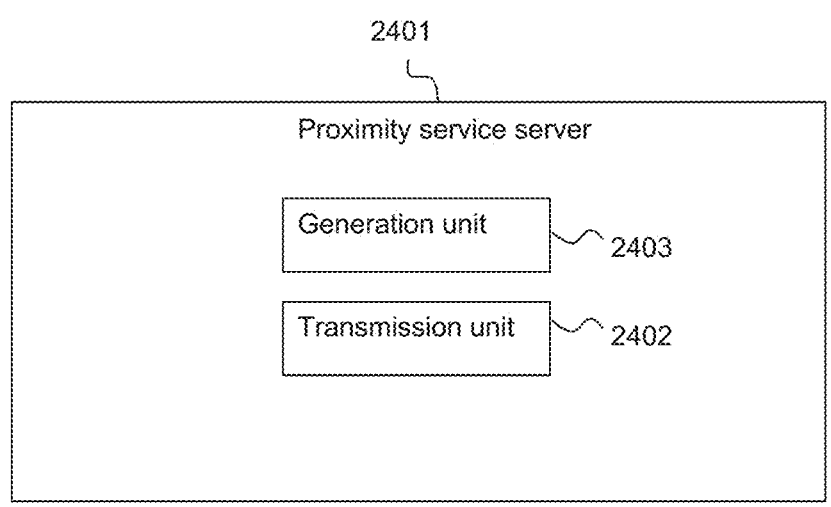
FIG. 24 is a block diagram illustrating another example of a server.

FIG. 24 illustrates functional units in another embodiment of a proximity service server 2401 or ProSe function of an end device acting as a discoverer. The proximity service server 2401 may execute any of the methods 1300 and 1400 described herein, for example according to computer readable instructions received from a computer program. It will be understood that the units illustrated in FIG. 24 are software implemented functional units, and may be realised in any appropriate combination of software modules.

Referring to FIG. 24, the proximity service server 2401 comprises a transmission unit 2402 for receiving from a second proximity service server at least a first discovery key, a ProSe query code and a ProSe response code, and a generation unit 2403 for generating a discovery filter based on the ProSe response code. The transmission unit 2402 further comprises means for sending the discovery filter, first discovery key and ProSe query code to a first end device, so that the first end device can securely discover a second end device over an air interface.

The transmission unit 2403 may further comprise means for receiving a match report request comprising a token based on a second discovery key and forwarding the token to the second proximity server for verification.

If the token is verified, the transmission unit 2402 further comprises means for receiving a response from the second proximity indicating that the second end device is genuine.

In another embodiment, the transmission unit comprises means for receiving a second discovery key from the second proximity service server and sending the second discovery key to the first end device.

The transmission unit 2402 may further comprise means for receiving a discovery request from the first end device indicating that the first end device wishes to discover the second end device of the second proximity service server.

The transmission unit 2402 may also comprise means for sending a discovery request to the second proximity service server indicating that the first end device wishes to discover the second end device of the second proximity service server.

In some examples, the generation unit 2403 and the transmission unit 2402 may be implemented with help from a computer program which, when run on a processor, causes the transmission unit, verification unit and the generation unit to cooperate to carry out examples of the method 1300 and 1400 described above.

Figure 25:
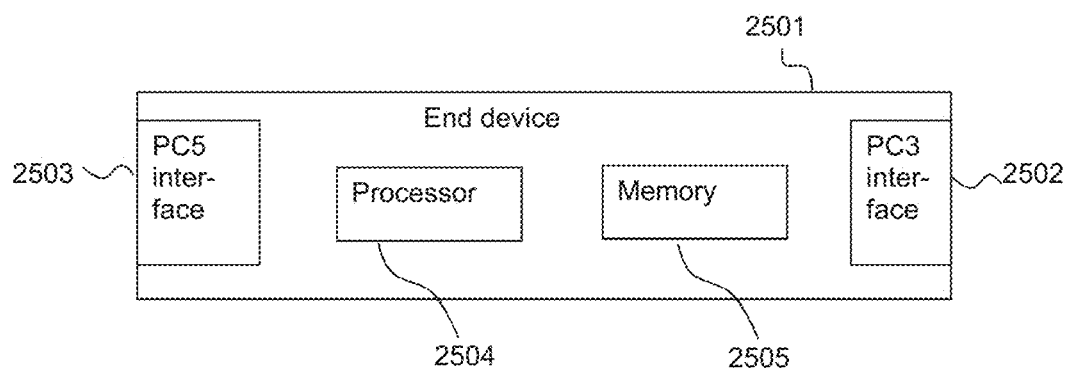
FIG. 25 is a block diagram illustrating an example of an end device.

FIG. 25 illustrates an end device 2501 which may act as a discoverer. The end device comprises a PC3 interface 2502 to communicate with its proximity service server or ProSe function. The end device 2501 also comprises a PC5 interface 2503 with which it communicates with a second end device (discoveree). The end device 2501 further comprises a processor 2504 and a memory 2505. The memory containing instructions executable by the processor, such that the end device is configured to receive a ProSe query code and a first discovery key from a proximity service server, sending to a second end device a direct discovery request comprising a token based on the first discovery key, and receiving from the second end device a discovery response comprising a ProSe response code and a second token.

The end device 2501 may be further configured to receive from the proximity service server a discovery filter based on the ProSe response code.

In one embodiment the end device 2501 is configured to identify the ProSe response code received from the second end device using the discovery filter.

The end device 2501 may be further configured to forward the second token to the proximity service server for verification. If the second token is verified, the end device may be configured to receive a message from the proximity service server indicating that the second end device is genuine.

In one embodiment, the end device 2501 is configured to receive a second discovery key from the proximity service server and the end device verifying the second token using the second discovery key thereby authenticating the second end device.

In one embodiment, the end device 2501 may be configured to send to the proximity service server a discovery request indicating that the end device wishes to discover the second device.

In another embodiment, a plurality of end devices 2501 may be configured to receive the same ProSe query code and first discovery key, and sending to the same second end device a direct discovery request and receiving from said same second end device a direct discovery response.

Figure 26:
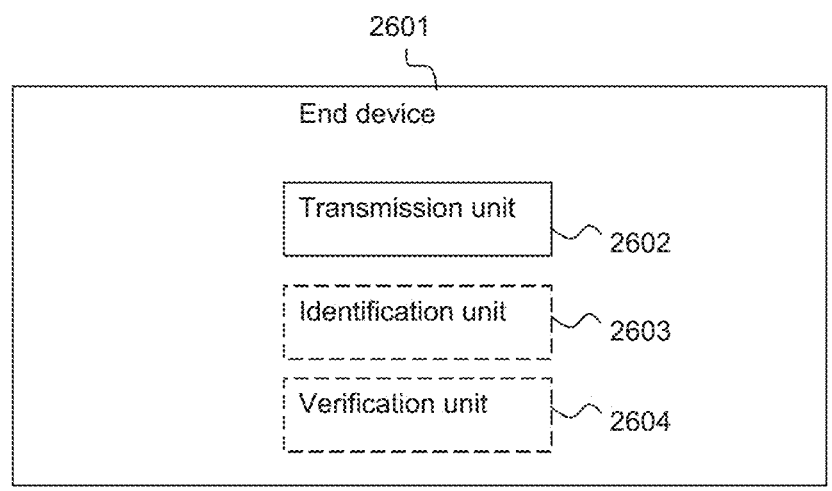
FIG. 26 is a block diagram illustrating another example of an end device.

FIG. 26 illustrates functional units in another embodiment of an end device 2601 (discoverer) which may execute any of the methods 1500 and 1600 described herein, for example according to computer readable instructions received from a computer program. It will be understood that the units illustrated in FIG. 26 are software implemented functional units, and may be realised in any appropriate combination of software modules.

Referring to FIG. 26, the end device 2601 comprises a transmission unit 2602 for receiving a ProSe query code and a first discovery key from a proximity service server, sending to a second end device a direct discovery request comprising a token based on the first discovery key, and receiving from the second end device a discovery response comprising a ProSe response code and a second token.

The transmission unit 2602 may further comprise means for receiving from the proximity service server a discovery filter based on the ProSe response code.

The end device may further comprise an identification unit 2603 for identifying the ProSe response code received from the second end device using the discovery filter. This optional feature is indicated by the dashed lines in FIG. 26.

The transmission unit 2602 may further comprise means for forwarding the second token to the proximity service server for verification. If the second token is verified, the transmission unit may further comprise means for receiving a message from the proximity service server indicating that the second end device is genuine.

In one embodiment, the transmission unit 2602 further comprises means for receiving a second discovery key from the proximity service server and the end device further comprises a verification unit 2604 for verifying the second token using the second discovery key thereby authenticating the second end device. The verification unit 2604 is optional as indicated by the dashed lines in FIG. 26.

The transmission unit 2602 may further comprise means for sending to the proximity service server a discovery request indicating that the end device wishes to discover the second device.

In one embodiment, there are a plurality of end devices 2601, and each end device comprises a transmission unit for receiving the same ProSe query code and first discovery key, and sending to the same second end device a direct discovery request and receiving from said same second end device a direct discovery response.

In some examples, the transmission unit 2602, the identification unit 2603 and the verification unit 2604 may be implemented with help from a computer program which, when run on a processor, causes the transmission unit, verification unit and the identification unit to cooperate to carry out examples of the method 1500 and 1600 described above.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method performed by a proximity service server in a Home Public Land Mobile Network (HPLMN) of a Discoveree User Equipment (UE), comprising,
   generating a proximity service (ProSO query code and a ProSe response code;
   sending at least the ProSe response code together with a first and a second discovery key to the Discoveree UE; and
   sending the first discovery key, the second discover key, and the ProSe query code to a Discoverer UE via a second proximity service server in an HPLMN of the Discoverer UE, so that the Discoverer UE can verify that the Discoveree UE is genuine.

2. The method according to claim 1, further comprising, as a preliminary step, generating the first discovery key and the second discovery key.

3. The method according to claim 1, further comprising, as a preliminary step, receiving the first and second discovery keys from a key management server.

4. The method according to claim 1, further comprising generating a discovery filter based on the ProSe Query code and sending the discovery filter to the Discoveree UE.

5. The method according to claim 1, further comprising receiving a discovery request via the second proximity service server from the Discoverer UE indicating that the Discoverer UE wishes to discover the Discoveree UE over an air interface, the proximity service server thereafter sends the first discovery key, the second discover key, and ProSe query code to the Discoverer UE via the second proximity service server.

6. A proximity service server comprising a processor and a memory, the memory containing instructions executable by the processor, such that the proximity service server is operable to carry out a method of claim 1.

7. A method performed by a proximity service server in a Home Public Land Mobile Network (HPLMN) of a Discoverer User Equipment (UE), the method comprising,
   receiving, from a proximity service server in an HPLMN of a Discoveree UE, a first discovery key, a second discovery key, a proximity service (ProSe) query code and a ProSe response code; and
   generating a discovery filter based on the ProSe response code and sending the discovery filter, first discovery key, second discovery key and ProSe query code to the Discoverer UE.

8. The method according to claim 7, further comprising:
   the proximity service server in the HPLMN of the Discoverer UE receiving a discovery request from the Discoverer UE indicating that the Discoverer UE wishes to discover the Discoveree UE; and
   sending a discovery request to the proximity service server in the HPLMN of the Discoveree UE indicating that the Discoverer UE wishes to discover the Discoveree UE.

9. A proximity service server comprising a processor and a memory, the memory containing instructions executable by the processor, such that the proximity service server is operable to carry out a method of claim 7.

* * * * *

UNITED STATES PATENT AND TRADEMARK OFFICE
CERTIFICATE OF CORRECTION

Page 1 of 3

PATENT NO. : 11,233,817 B2
APPLICATION NO. : 16/794767
DATED : January 25, 2022
INVENTOR(S) : Lehtovirta et al.

It is certified that error appears in the above-identified patent and that said Letters Patent is hereby corrected as shown below:

On the Title Page

Item (74), under "Attorney, Agent, or Firm", in Column 2, Lines 1-2, delete "Rothweil, Figg, Ernst & Manbeck, P.C." and insert -- Rothwell, Figg, Ernst & Manbeck, P.C. --, therefor.

In the Figure, for Tag "802", in Line 1, delete "at least a the" and insert -- at least the --, therefor.

In the Drawings

In Fig. 5, Sheet 4 of 20, delete " 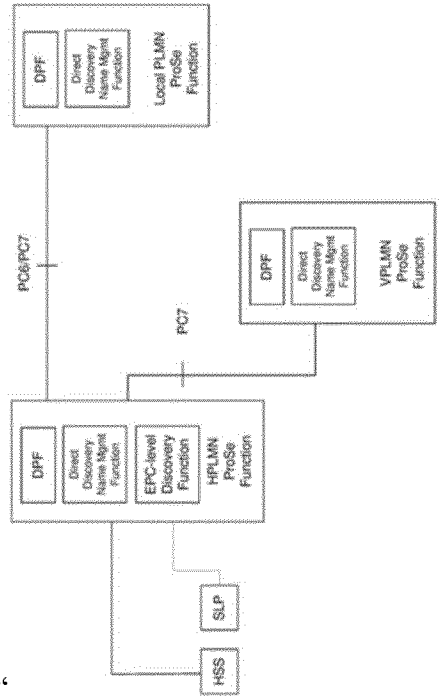 " and

Signed and Sealed this
Twenty-first Day of March, 2023

Katherine Kelly Vidal
*Director of the United States Patent and Trademark Office* insert -- 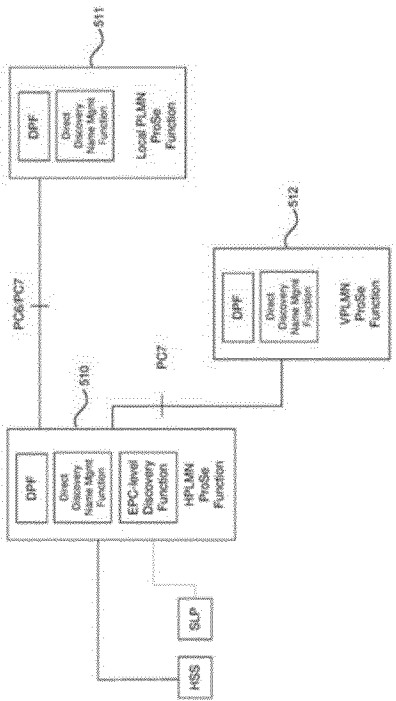 --, therefor.

Figure 8:
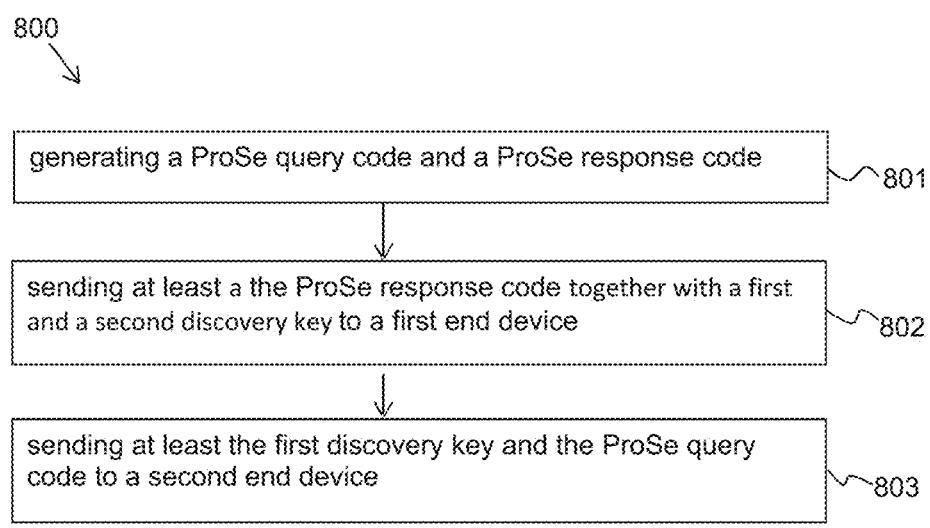
FIG. 8 is a flow chart illustrating method steps according to an embodiment of the present invention performed by a server.

In Fig. 8, Sheet 7 of 20, for Tag "802", in Line 1, delete "at least a the" and insert -- at least the --, therefor.

In Fig. 9, Sheet 8 of 20, for Tag "904", in Line 1, delete "at least a the" and insert -- at least the --, therefor.

Figure 10:
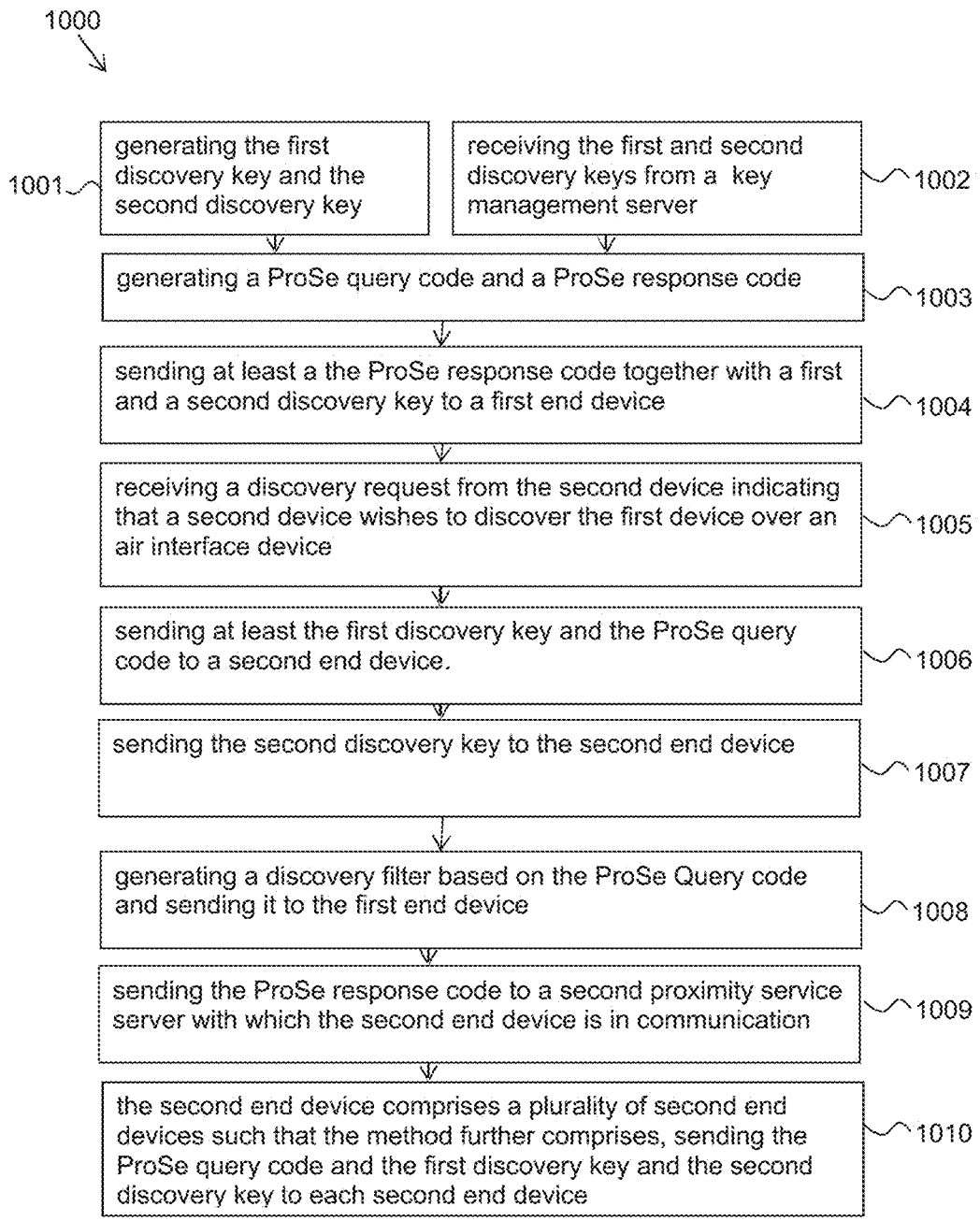
FIG. 10 is a flow chart illustrating method steps according to yet another embodiment of the invention performed by a server.

In Fig. 10, Sheet 9 of 20, for Tag "1004", in Line 1, delete "at least a the" and insert -- at least the --, therefor.

In Fig. 10, Sheet 9 of 20, for Tag "1005", in Line 1, delete "second device" and insert -- second end device --, therefor.

Figure 14:
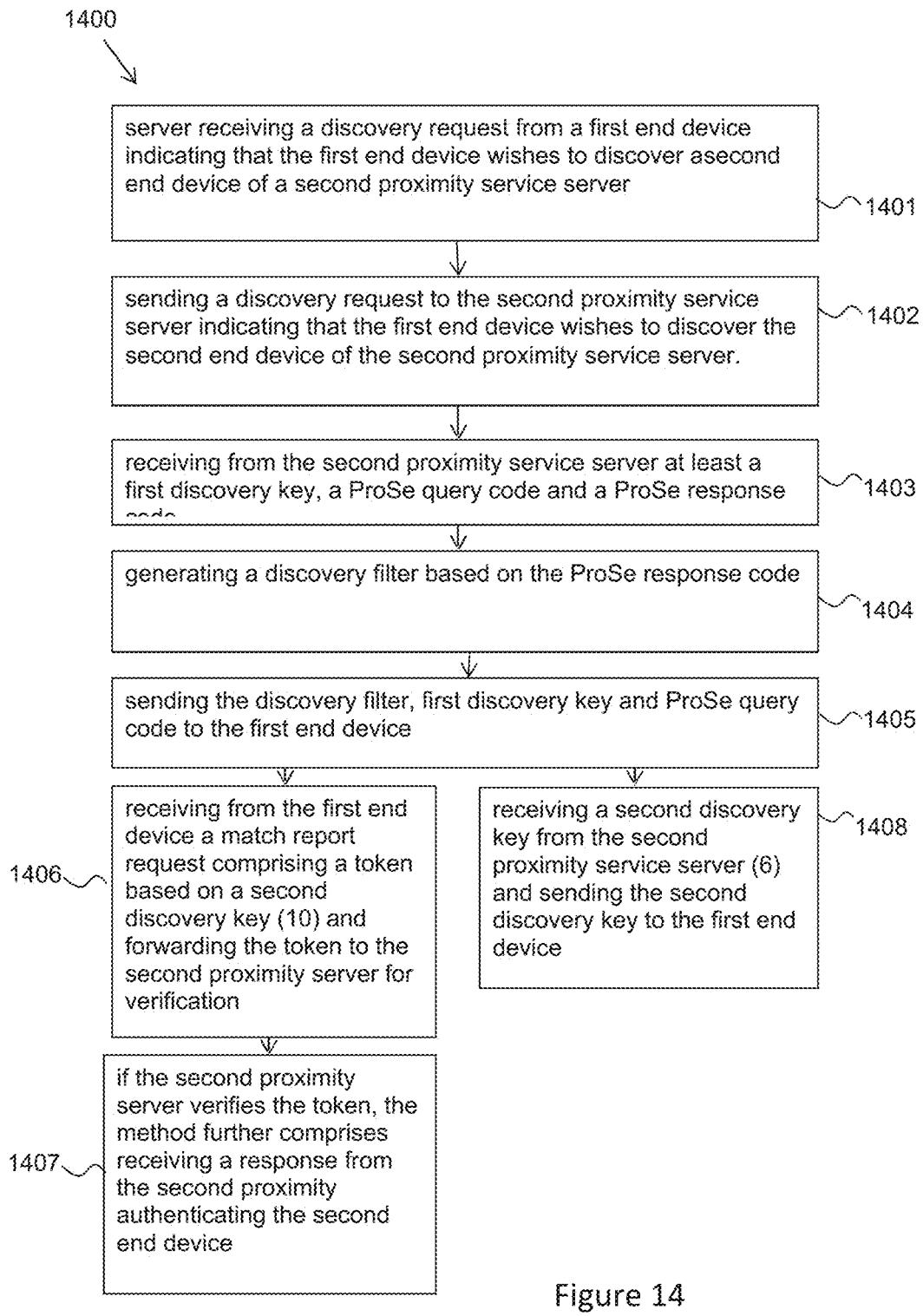
FIG. 14 is a flow chart illustrating method steps according to another embodiment of the invention performed by a server.

In Fig. 14, Sheet 13 of 20, delete " receiving from the second proximity service server at least a first discovery key, a ProSe query code and a ProSe response code 1403 " and insert -- receiving from the second proximity service server at least a first discovery key, a ProSe query code and a ProSe response code 1403 --, therefor.

In the Specification

In Column 1, Line 9, delete "a 371(c)" and insert -- a § 371(c) --, therefor.

CERTIFICATE OF CORRECTION (continued)
U.S. Pat. No. 11,233,817 B2

In Column 1, Line 10, delete "2017" and insert -- 2017, now Pat. No. 10,602,356, --, therefor.

In Column 1, Line 38, delete "Extended Packet Core (EPC)" and insert -- Evolved Packet Core (EPC) --, therefor.

In Column 2, Line 48, delete "second discover key," and insert -- second discovery key, --, therefor.

In Column 6, Line 11, delete "Extended Packet Core (EPC)" and insert -- Evolved Packet Core (EPC) --, therefor.

In Column 7, Line 12, delete "Prose" and insert -- ProSe --, therefor.

In Column 11, Line 51, delete "discoverer UE 653" and insert -- discoverer UE 753 --, therefor.

In Column 12, Line 52, delete "so to" and insert -- so as to --, therefor.

In Column 15, Line 49, delete "end devise" and insert -- end device --, therefor.

In Column 16, Line 47, delete "to verifying" and insert -- to verify --, therefor.

In Column 16, Line 49, delete "sending" and insert -- send --, therefor.

In Column 16, Line 61, delete "is not" and insert -- are not --, therefor.

In Column 18, Line 48, delete "transmission unit 2204" and insert -- transmission unit 2202 --, therefor.

In Column 19, Line 53, delete "transmission unit 2403" and insert -- transmission unit 2402 --, therefor.

In the Claims

In Column 21, Line 53, in Claim 1, delete "(ProSO" and insert -- (ProSe) --, therefor.

In Column 22, Line 4, in Claim 1, delete "second discover key," and insert -- second discovery key, --, therefor.

In Column 22, Line 22, in Claim 5, delete "second discover key," and insert -- second discovery key, --, therefor.